US009302900B2

(12) United States Patent
Meeuwisse

(10) Patent No.: US 9,302,900 B2
(45) Date of Patent: Apr. 5, 2016

(54) COLORANT FLUID DISPENSING SYSTEM

(75) Inventor: Renatus Petrus Cornelis Meeuwisse, Leidschendam (NL)

(73) Assignee: FUELL PROCESS S.A., Fribourg (CH)

( * ) Notice: Subject to any disclaimer, the term of this patent is extended or adjusted under 35 U.S.C. 154(b) by 78 days.

(21) Appl. No.: 14/122,387

(22) PCT Filed: Jun. 20, 2012

(86) PCT No.: PCT/NL2012/050431
§ 371 (c)(1),
(2), (4) Date: Feb. 24, 2014

(87) PCT Pub. No.: WO2012/177127
PCT Pub. Date: Dec. 27, 2012

(65) Prior Publication Data
US 2014/0151403 A1   Jun. 5, 2014

(30) Foreign Application Priority Data
Jun. 21, 2011  (NL) .................................... 2006972

(51) Int. Cl.
*B67D 7/78* (2010.01)
*B67D 7/22* (2010.01)
(Continued)

(52) U.S. Cl.
CPC . *B67D 7/22* (2013.01); *B01F 9/003* (2013.01); *B01F 9/0018* (2013.01);
(Continued)

(58) Field of Classification Search
CPC ..... G01G 11/08; G01G 11/06; G01G 11/003; G01G 13/16; B65D 77/065; B65D 83/0072; A47G 2019/122; B67D 7/22; B01F 9/0018; B01F 9/003; B01F 13/1063; B01F 15/0256; B01F 15/0445

USPC ...................... 222/1, 52, 58, 144, 144.5, 105, 222/325–326, 386
See application file for complete search history.

(56) References Cited

U.S. PATENT DOCUMENTS 5,690,252 A   11/1997   Oleksiewicz
6,000,837 A   12/1999   Randsborg et al.
(Continued)

FOREIGN PATENT DOCUMENTS

CN   1070624 A   4/1993
CN   1177335 A   3/1998
(Continued)

OTHER PUBLICATIONS

International Search Report and Written Opinion, PCT/NL2012/050431, Sep. 14, 2012, 12 pages.
(Continued)

*Primary Examiner* — Frederick C Nicolas
(74) *Attorney, Agent, or Firm* — Edell, Shapiro & Finnan, LLC

(57) ABSTRACT

A colorant fluid dispensing system (1) for dispensing multiple colorant fluids, wherein the dispensing system includes more than one fluid holder (3) for holding a colorant fluid, a dispensing device (4) for dispensing the colorant fluids held by the fluid holders out of a system outlet (5), wherein the dispensing system (4) includes a weight measuring device constructed and arranged to measure weight changes of the fluid holder during the dispensing of the colorant fluid from the fluid holder, and the fluid holder is constructed and arranged to drive the colorant fluid out of the fluid holder.

19 Claims, 19 Drawing Sheets

(51) Int. Cl.
*B01F 9/00* (2006.01)
*B01F 13/10* (2006.01)
*B01F 15/02* (2006.01)
*B01F 15/04* (2006.01)
*G01G 13/16* (2006.01)
*G01G 11/06* (2006.01)
*G01G 11/08* (2006.01)
*B65D 83/00* (2006.01)

(52) U.S. Cl.
CPC ........ *B01F 13/1063* (2013.01); *B01F 15/0256* (2013.01); *B01F 15/0445* (2013.01); *B65D 83/0072* (2013.01); *G01G 11/06* (2013.01); *G01G 11/08* (2013.01); *G01G 13/16* (2013.01)

(56) References Cited

U.S. PATENT DOCUMENTS

| | | | |
|---|---|---|---|
| 6,969,190 B1 * | 11/2005 | McClain et al. | 366/141 |
| 8,042,578 B2 * | 10/2011 | Post et al. | 141/83 |
| 2004/0216804 A1 | 11/2004 | Luehrsen et al. | |
| 2005/0038557 A1 * | 2/2005 | Friel et al. | 700/233 |
| 2005/0189037 A1 | 9/2005 | Cortes Ferriz | |
| 2005/0194403 A1 | 9/2005 | Mink et al. | |
| 2008/0195250 A1 | 8/2008 | Post et al. | |
| 2008/0257446 A1 * | 10/2008 | Oakes | 141/1 |
| 2011/0101028 A1 | 5/2011 | Chassaing | |

FOREIGN PATENT DOCUMENTS

| | | |
|---|---|---|
| CN | 1925905 A | 3/2007 |
| CN | 101391190 A | 3/2009 |
| EP | 0537434 A1 | 8/1992 |
| EP | 1950538 A2 | 7/2008 |
| NL | 1018867 C1 | 2/2003 |
| WO | 2010052002 A2 | 5/2010 |

OTHER PUBLICATIONS

NL Search Report, Dec. 15, 2011, 6 pages.

* cited by examiner

COLORANT FLUID DISPENSING SYSTEM

FIELD OF THE INVENTION

The invention relates to a colorant fluid dispensing system for dispensing multiple colorant fluids.

BACKGROUND OF THE INVENTION

The colorant fluid dispensing system is used for dispensing multiple colorant fluids which in practice are often delivered to a paint container comprising paint that needs to be coloured. Other applications of the colorant fluid dispensing system are possible.

SUMMARY OF THE INVENTION

The colorant fluid dispensing system comprises more than one fluid holder for holding a colorant fluid and a dispensing device for dispensing the colorant fluids held by the fluid holders out of a system outlet.

In an embodiment of the dispensing device, the dispensing system comprises a weight measuring device constructed and arranged to measure weight changes of the fluid holder during the dispensing of the colorant fluid from said fluid holder, and the fluid holder is constructed and arranged to drive the colorant fluid out of said fluid holder.

In an embodiment of the dispensing device, the weight measuring device is constructed and arranged to support the fluid holder from which colorant fluid is dispensed in the vertical direction.

In an embodiment of the dispensing device, the dispensing system is constructed and arranged to, apart from the force applied by the weight measuring device, in the vertical direction only apply a constant force to the fluid holder from which colorant fluid is dispensed.

In an embodiment of the dispensing device, said constant vertical force in use compensates around 50% of the weight of the fluid holder holding the colorant fluid.

In an embodiment of the dispensing device, the dispensing device is constructed and arranged to apply the constant vertical force on the fluid holder.

In an embodiment of the dispensing device, the fluid holder comprises at least one support member and the weight measuring device is configured and arranged to support the fluid holder via the at least one support member.

In an embodiment of the dispensing device, the dispensing system comprises a holder transporter for transporting the fluid holders along a trajectory.

In an embodiment of the dispensing device, the dispensing system comprises a transfer device constructed and arranged to transfer the fluid holders from the holder transporter into a dispensing position and back to the holder transporter.

In an embodiment of the dispensing device, the fluid holder located in the dispensing position is uncoupled from the holder transporter.

In an embodiment of the dispensing device, the holder transporter is constructed and arranged to position the fluid holders in a transfer position allowing the fluid holders to be transferred from the holder transporter.

In an embodiment of the dispensing device, the transfer device is constructed and arranged to transfer the fluid holders located in the transfer position into the dispensing position and back into the transfer position.

In an embodiment of the dispensing device, the weight measuring device is constructed and arranged to measure the weight changes of the fluid holder positioned in the dispensing position.

In an embodiment of the dispensing device, the dispensing system comprises a controlling device constructed and arranged to control the operation of the dispensing system.

In an embodiment of the dispensing device, the fluid holder comprises a holder outlet which in use comprises a fluid connection with the colorant fluid, the holder outlet comprises a holder valve which is connected to the fluid connection and placeable in a closed position in which the fluid connection is closed and an open position in which the fluid connection is open.

In an embodiment of the dispensing device, the dispensing device is constructed and arranged to place the holder valve in the closed position and in the open position.

In an embodiment of the dispensing device, the fluid holder comprises a holder driver to drive the colorant fluid out of the fluid holder.

In an embodiment of the dispensing device, the holder driver is only connected to the fluid holder.

In an embodiment of the dispensing device, the fluid holder comprises at least one movable pressure member and the holder driver is constructed and arranged to drive at least one pressure member for applying a pressure to the colorant fluid.

In an embodiment of the dispensing device, the holder driver is constructed and arranged to apply a substantially constant pressure to the colorant fluid.

In an embodiment of the dispensing device, the holder driver is constructed and arranged to continuously drive at least one pressure member.

In an embodiment of the dispensing device, the holder driver comprises a spring.

In an embodiment of the dispensing device, the fluid holder comprises a fluid space for receiving the colorant fluid and the at least one pressure member is constructed and arranged to move such that the volume of the fluid space is reduced.

In an embodiment of the dispensing device, the fluid holder is constructed and arranged to hold a flexible fluid package containing colorant fluid and to apply a pressure to the fluid package to drive the colorant fluid out of the fluid package.

In an embodiment of the dispensing device, the fluid space is constructed and arranged to receive the fluid package.

In an embodiment of the dispensing device, the fluid holder comprises two pressure members between which in use the fluid package is held and at least one of the pressure members is moveable relative to the other pressure member.

In an embodiment of the dispensing device, the holder driver is constructed and arranged to drive the pressure members towards each other.

In an embodiment of the dispensing device, the pressure members are pivotable relative to each other.

In an embodiment of the dispensing device, the fluid holder comprises an attachment unit constructed and arranged to in use attach the fluid package to the fluid holder.

In an embodiment of the dispensing device, the weight measuring device is constructed and arranged to in use provide substantially the only support in the vertical direction of the fluid holder from which colorant fluid is dispensed.

In an embodiment of the dispensing device, the dispensing device is constructed and arranged to apply a force on the holder valve in a horizontal direction.

In an embodiment of the dispensing device, the dispensing device comprises a movable valve actuator constructed and arranged to apply the horizontal force on the holder valve.

In an embodiment of the dispensing device, the fluid holder comprises a fixating member constructed and arranged to withstand the horizontal force applied by the dispensing device on the holder valve.

In an embodiment of the dispensing device, the dispensing system comprises a dispensing support constructed and arranged to in a horizontal direction remain in a stationary position and the fixating member of the fluid holder from which the colorant fluid is dispensed is placed in contact with the dispensing support.

In an embodiment of the dispensing device, the holder valve is constructed and arranged to be in the closed position when not activated and in the open position when activated by the dispensing device.

In an embodiment of the dispensing device, the dispensing device is constructed and arranged to active the holder valve.

In an embodiment of the dispensing device, the weight measuring device comprises a communication connection with the controlling device.

In an embodiment of the dispensing device, the controlling device comprises a calculator constructed and arranged to calculate weight changes of the fluid holder during the dispensing of the colorant fluid from said fluid holder.

In an embodiment of the dispensing device, the controlling device is constructed and arranged to control the dispensing device on basis of data provided by the weight measuring device.

In an embodiment of the dispensing device, the holder transporter is constructed and arranged to change the orientation of the fluid holders to achieve a mixing effect in the colorant fluids held by the fluid holders.

In an embodiment of the dispensing device, the holder transporter is constructed and arranged to position the fluid holders near the system outlet.

In an embodiment of the dispensing device, the holder transporter is constructed and arranged to removably hold the fluid holders.

In an embodiment of the dispensing device, the fluid holder is constructed and arranged to be attached to the holder transporter.

In an embodiment of the dispensing device, the at least one pressure member is constructed and arranged to engage the holder transporter.

In an embodiment of the dispensing device, the at least one pressure member is constructed and arranged to attach the fluid holder to the holder transporter.

In an embodiment of the dispensing device, the fluid holder is constructed and arranged to free the fluid package from pressure when the fluid holder is attached to the holder transporter.

The colorant fluid dispensing system may comprise any feature disclosed in the figures and/or the description. The colorant fluid dispensing system may comprise said feature independent of or in combination with one or more of the other features disclosed.

The invention further relates to a method of dispensing a colorant fluid from a dispensing system according to the invention, wherein the method comprises measuring weight changes of the fluid holder during the dispensing of the colorant fluid from said fluid holder.

The invention further relates to a use of a colorant fluid dispensing system according to the invention.

BRIEF DESCRIPTION OF THE DRAWINGS

Embodiments of the colorant fluid dispensing system will be described by way of example only, with reference to the accompanying schematic drawings in which corresponding reference symbols indicate corresponding parts, and in which.

DETAILED DESCRIPTION OF THE DRAWINGS

Figure 1:
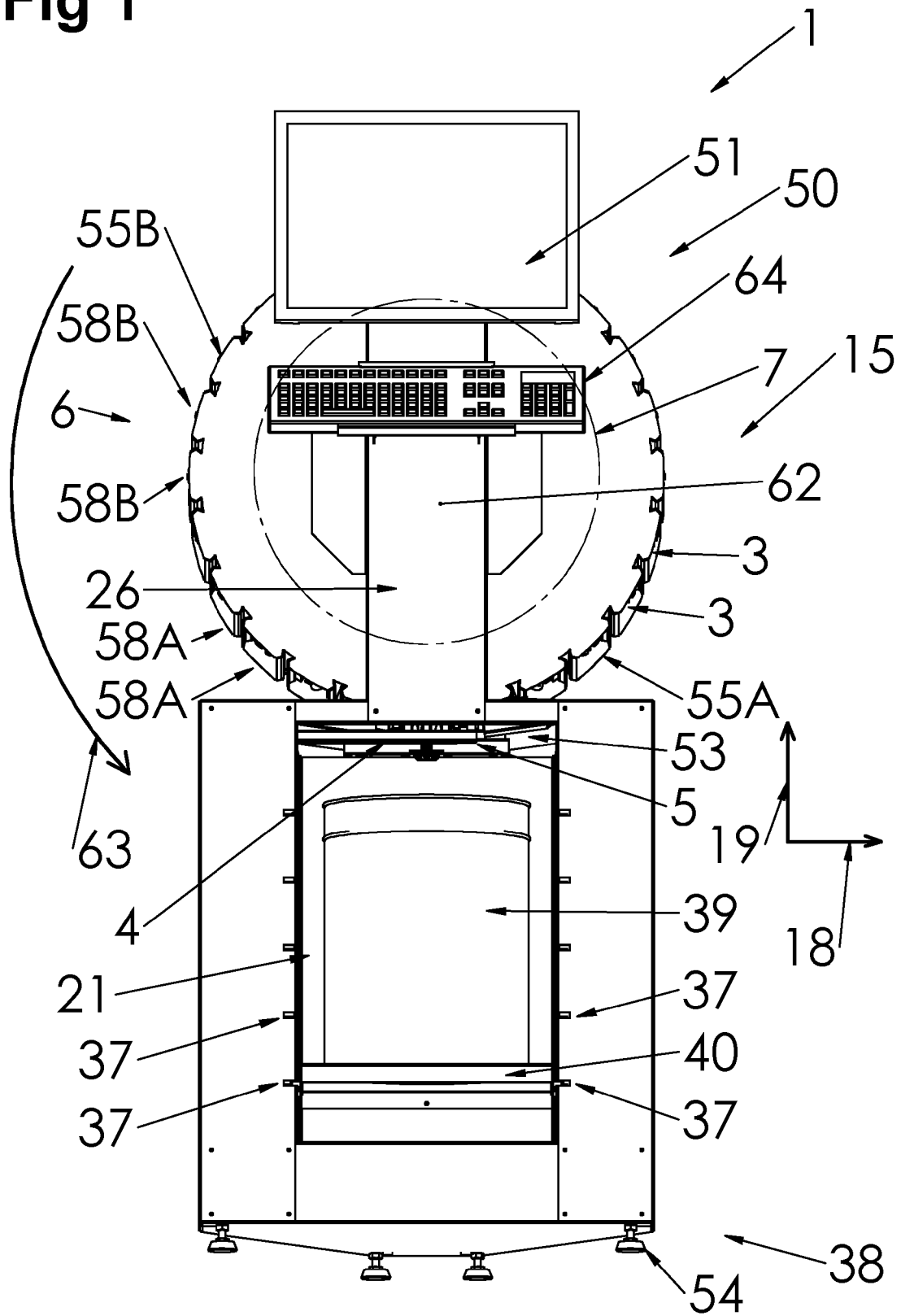
FIG. 1 schematically shows a view in perspective of the front of an embodiment of the colorant fluid dispensing system, FIG. 2 schematically shows the view of FIG. 1 where several parts are removed, FIG. 3 schematically shows a further view in perspective of the colorant fluid dispensing system of FIG. 1, FIG. 4 schematically shows a side view of the colorant fluid dispensing system of FIG. 1, the FIGS. 5-8 schematically show views in perspective of the fluid holder of the colorant fluid dispensing system of FIG. 1, the FIGS. 9-19 schematically show an operation of the colorant fluid dispensing system of FIG. 1.

FIG. 1 shows an embodiment of the colorant fluid dispensing system. The colorant fluid dispensing system 1 is constructed and arranged to dispense multiple colorant fluids.

The dispensing system 1 comprises more than one fluid holder 3 constructed and arranged to hold a colorant fluid. The colorant fluids of the fluid holders 3 may differ from each other. Said colorant fluids may for example differ in colour from each other. Several fluid holders 3 may hold the same type of colorant fluid.

The dispensing system 1 comprises a dispensing device 4 for dispensing the colorant fluids held by the fluid holders 3 out of a system outlet 5. In other examples, the system outlet 5 can comprise multiple system outlets 5.

A container support 40 is provided to in use hold a paint container 39 under the system outlet 5 in order to receive the colorant fluid dispensed by the dispensing system 1. The container support 40 is supported by a base structure 38 which in use is placed on a surface, such as a floor or platform. In said position, the dispensing system 1 is positioned in the use position 15. The base structure 38 is in use supported by the surface via support members 54.

The distance between the system outlet 5 and the container support 40 is adjustable. The container support 40 is placed in two opposite support receiving openings 37 which hold the container support 40 in a specific position. Several pairs of support receiving openings 37 are provided at different distances from the system outlet 5. The distance between the system outlet 5 and the container support 40 can be adjusted by placing the container support 40 in different pairs of support receiving openings 37. In other examples, the position of the container support 40 can be adjusted by a mechanically or electronically movable container support 40.

The dispensing system 1 comprises a holder transporter 6 for transporting the fluid holders 3 along a trajectory 7. The holder transporter 6 is constructed and arranged to change the orientation of the fluid holders 3 to achieve a mixing effect in the colorant fluids held by the fluid holders 3.

Particles in a colorant fluid often tend to settle which results in an inhomogeneous colorant fluid. In general it is required that a colorant fluid is frequently mixed to ensure that the colorant fluid remains substantially homogeneous. In one aspect of the dispensing system 1, a mixing effect in the colorant fluids is achieved by the movement of the fluid holders 3. In one aspect of the dispensing system 1, the dispensing system 1 tends to achieve the required mixing in the colorant fluids without the use of an additional stirring device.

The holder transporter 6 comprises a first rotation plate 55A and a second rotation plate 55B. The holder transporter 6 is configured and arranged to rotate the rotation plates 55 around a rotation axis 62. Said rotational movement is indicated by arrow 63. The fluid holders 3 are positioned between the rotation plates 55 and attached to the rotation plates 55 so that the fluid holders 3 are moved along with the rotation plates 55. The fluid holders 3 are attached to the rotation plates 55 by engaging a first attachment member 58A provided on the first rotation plate 55A and a second attachment member 58B provided on the second rotation plate 55B. In other examples, the fluid holders 3 can be attached to rotating arms in stead of a rotation plate. Other movements of the fluid holders than rotational movements may be provided. In other examples, the holder transporter 6 can comprise a rail or different type of track along which the fluid holders 3 are guided.

The trajectory 7 along which the fluid holders 3 are transported in the shown embodiment is an endless trajectory. In other examples the trajectory 7 can comprise ends, wherein the fluid holders 3 for example are transported back and forth along said trajectory 7 between the ends.

The trajectory 7 along which the fluid holders 3 are transported in the shown embodiment is circular. In other examples the trajectory 7 can be non-circular, such as oval or the trajectory can have a mountain-like form or a valley-like form.

Figure 2:
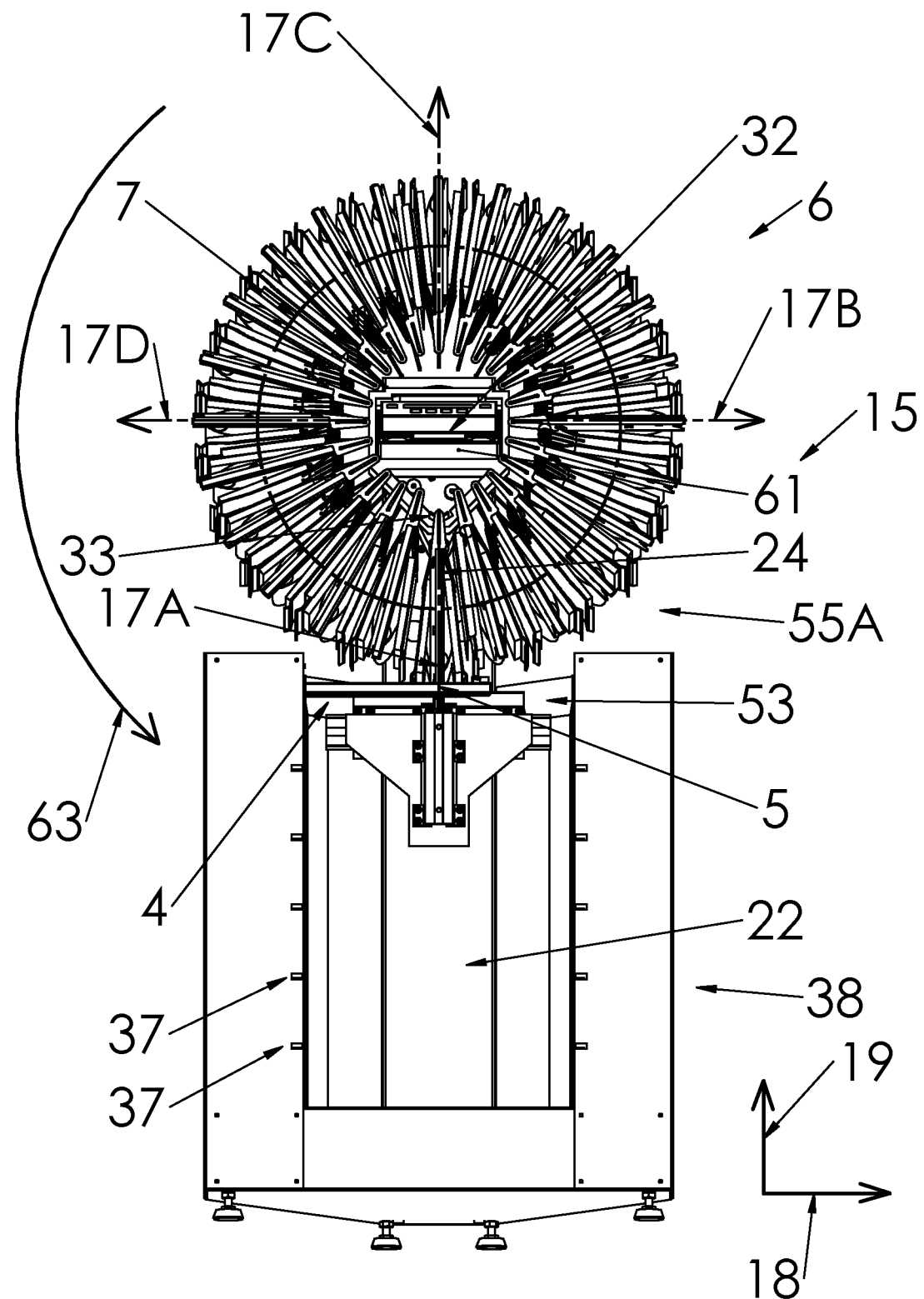

FIG. 2 schematically shows the view of FIG. 1 where several parts are removed to show the inside of the dispensing system 1. Amongst others, the second rotation plate 55B is removed to obtain a clear view on the fluid holders 3. The dispensing system 1 is shown in the use position 15 and the horizontal 18 and vertical 19 are indicated.

The holder transporter 6 is constructed and arranged to change the orientation of the fluid holders 3 during the transportation of the fluid holders 3 along the trajectory 7. The holder transporter 6 is constructed and arranged to in use hold the fluid holders 3 in a first orientation in which an orientation line 17A extending through the fluid holders 3 is oriented in a downwards vertical direction and to change the orientation of the fluid holders 3 into a second orientation wherein the orientation line 17B-D is oriented in a different orientation than said downwards vertical direction.

In the embodiment shown, each of the fluid holders 3 is oriented in a different orientation by the rotation of the rotation plates 55. During said rotation each fluid holder 3 is oriented such that the orientation line 17 thereof is oriented as shown by the indicated lines 17A-D. The orientation line 17A indicates the downwards vertical direction. The orientation line 17B is oriented under an angle of 90° relative to said downwards vertical direction. The orientation line 17B extends traverse, more specifically perpendicular, relative to said downwards vertical direction. The orientation line 17C is oriented under an angle of 180° relative to said downwards vertical direction.

Figure 3:
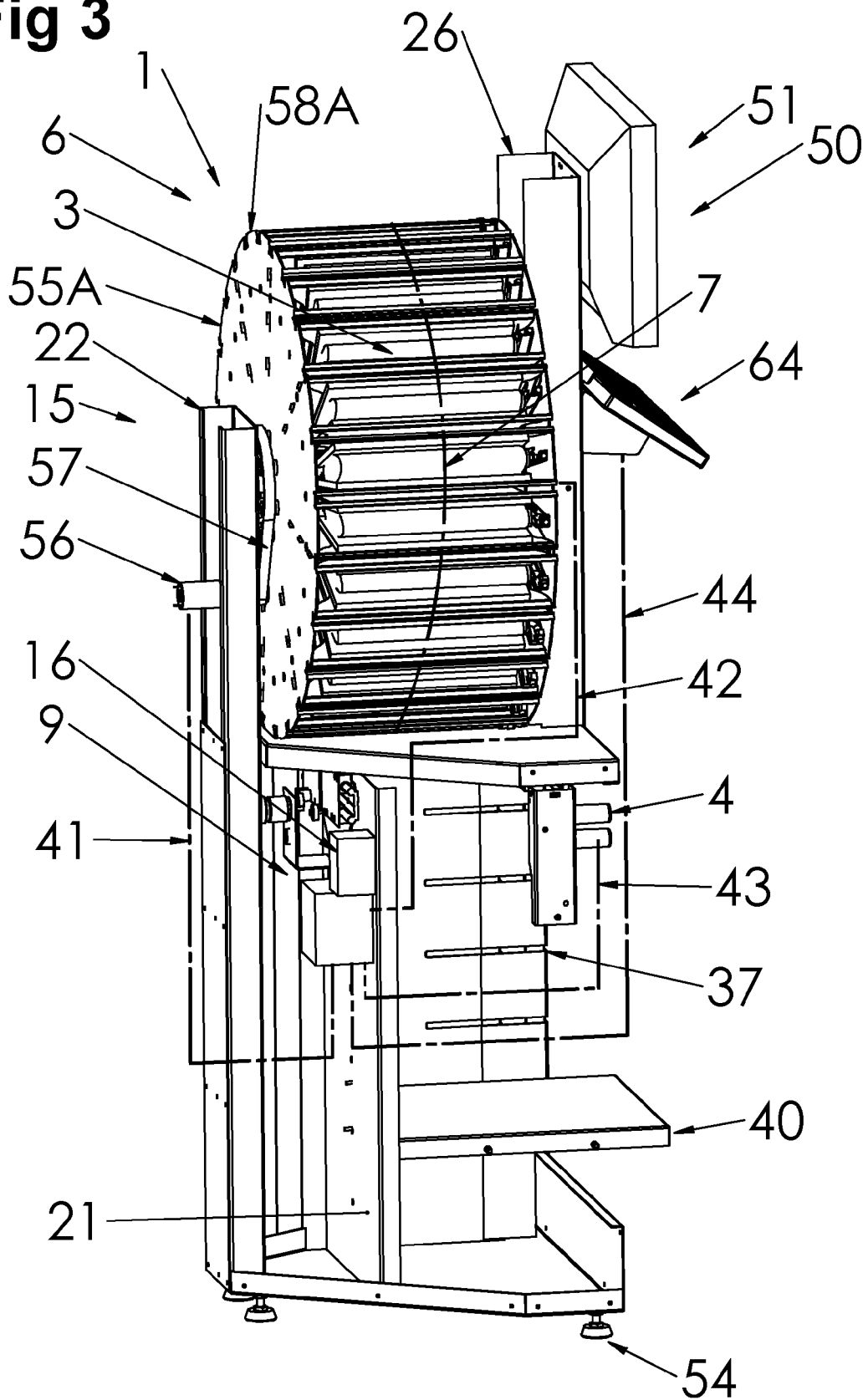

FIG. 3 shows a further view in perspective of the dispensing system of FIG. 1. The holder transporter 6 is rotatably supported by an upwardly extending first support beam 22. A cover wall 21 is placed between the first support beam 22 and the container support 40.

The holder transporter 6 comprises a transporter driver 56 constructed and arranged to drive the fluid holders 3 along the trajectory 7. In the embodiment shown, the transporter driver 56 comprises an electrical rotation motor which is coupled to the first rotation plate 55A via an endless belt 57. When the rotation motor rotates, said movement is transferred to the first rotation plate 55A via the belt 57. The first and second rotation plate 55 are interconnect, which means that both rotation plates 55 are rotated when the first rotation plate 55 is driven by the holder transporter 6. Other types of transporter drivers 56 can be use to rotate the rotation plates 55. In other examples the transporter driver 56 can comprise a electrical driving wheel for moving the fluid holder 3 along a rail of different type of track.

The dispensing system 1 comprises a controlling device 9 constructed and arranged to control the operation of the dispensing system 1.

The controlling device 9 is connected to the transporter driver 56 via a first communication connection 41. This allow the controlling device 9 and the transporter driver 56 to communicate with each other. The controlling device 9 is connected to a weight measuring device 32 via a second communication connection 42. This allow the controlling device 9 and the weight measuring device 32 to communicate with each other. The controlling device 9 is connected to the dispensing device 4 via a third communication connection 43. This allow the controlling device 9 and the dispensing device 4 to communicate with each other. The controlling device 9 is connected to a user interface 50 via a fourth communication connection 44. This allow the controlling device 9 and the user interface 50 to communicate with each other. The user interface 50 comprise a screen 51 and keyboard 64 which are attached to an upwardly extending second support beam 26.

The communication connections 41-44 are schematically indicated. In practice said communication connections 41-44 will in general mainly extend through the inside of the dispensing system 1.

The holder transporter 6 is constructed and arranged to position the fluid holders 3 near the system outlet 5. For dispensing the colorant fluid of a fluid holder 3, said fluid holder 3 is positioned near the system outlet 5.

The controlling device 9 is constructed and arranged to activate the holder transporter 6 during time periods wherein no colorant fluid is dispensed. In general, the fluid holders 3 will be moved along the trajectory 7 when colorant fluid needs to be dispensed. The fluid holders 3 are transported along the trajectory during time periods wherein no colorant fluid is dispensed. The controlling device 9 is constructed and arranged to activate the holder transporter 6 when the fluid holders 3 have not been moved along the trajectory 7 for a predetermined time period. In one aspect of the dispensing system 1, a mixing effect in the colorant fluids tends to be achieved during the time periods that no colorant fluid is dispensed.

Figure 4:
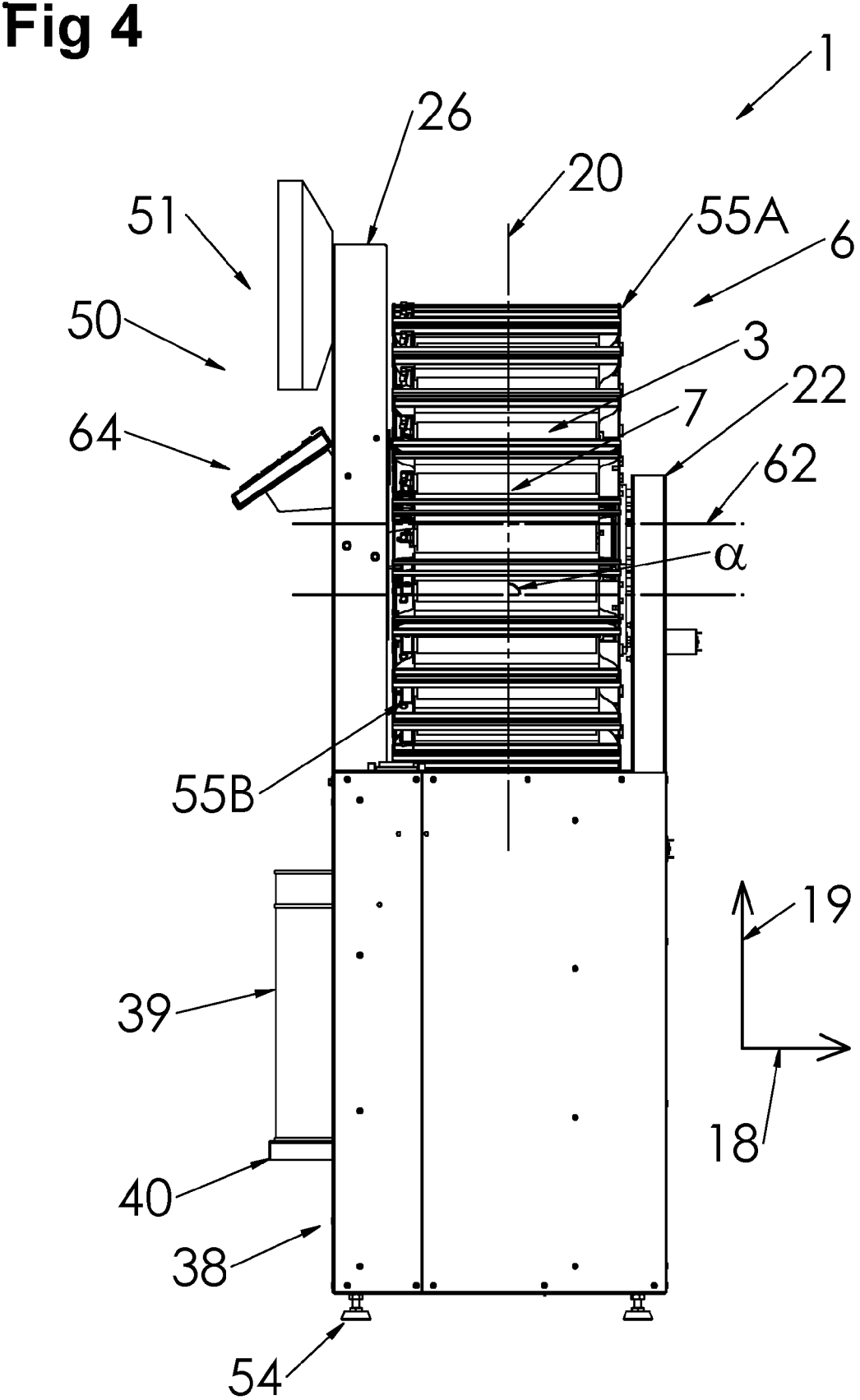
Figure 5:
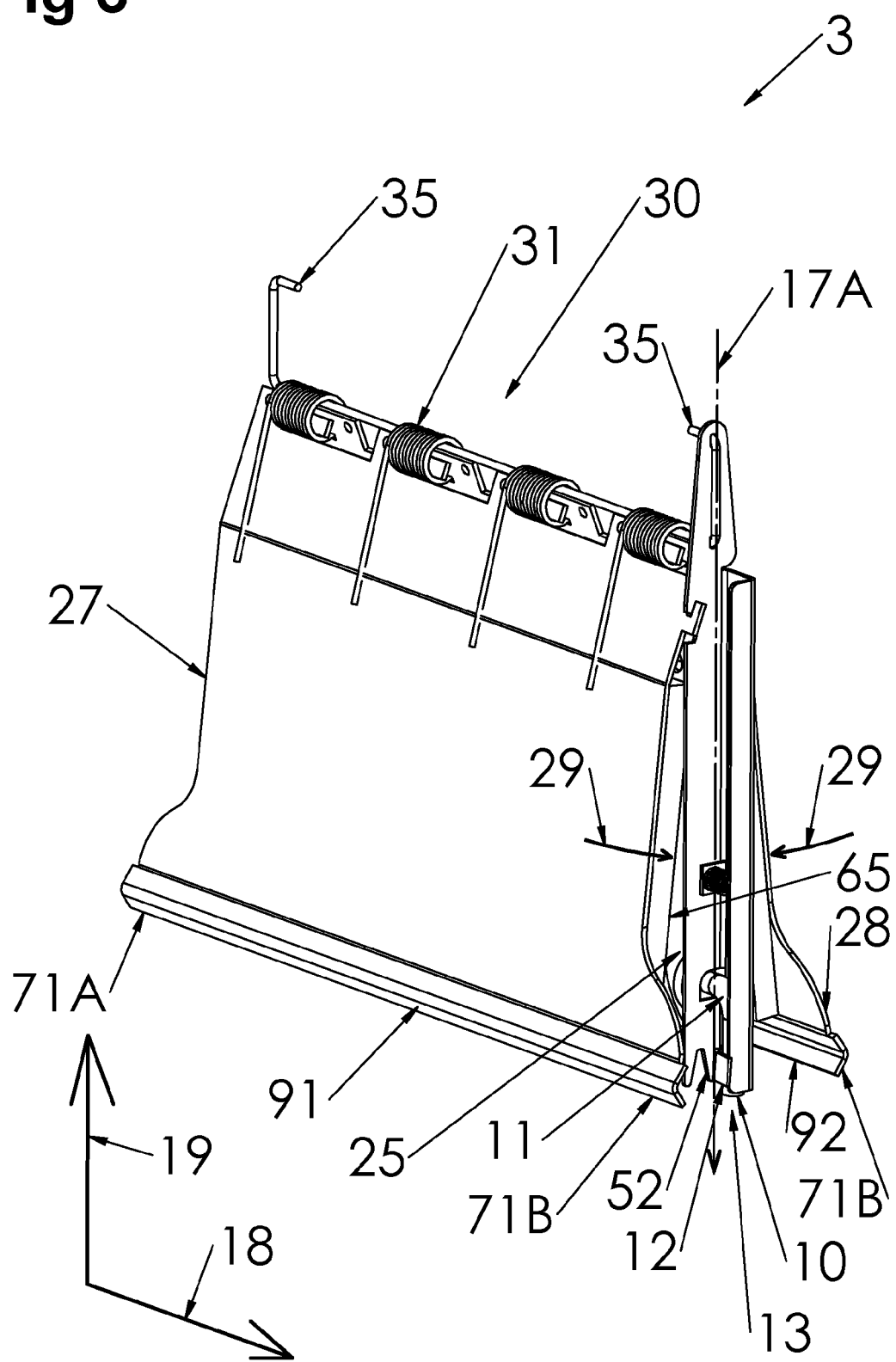
Figure 6:
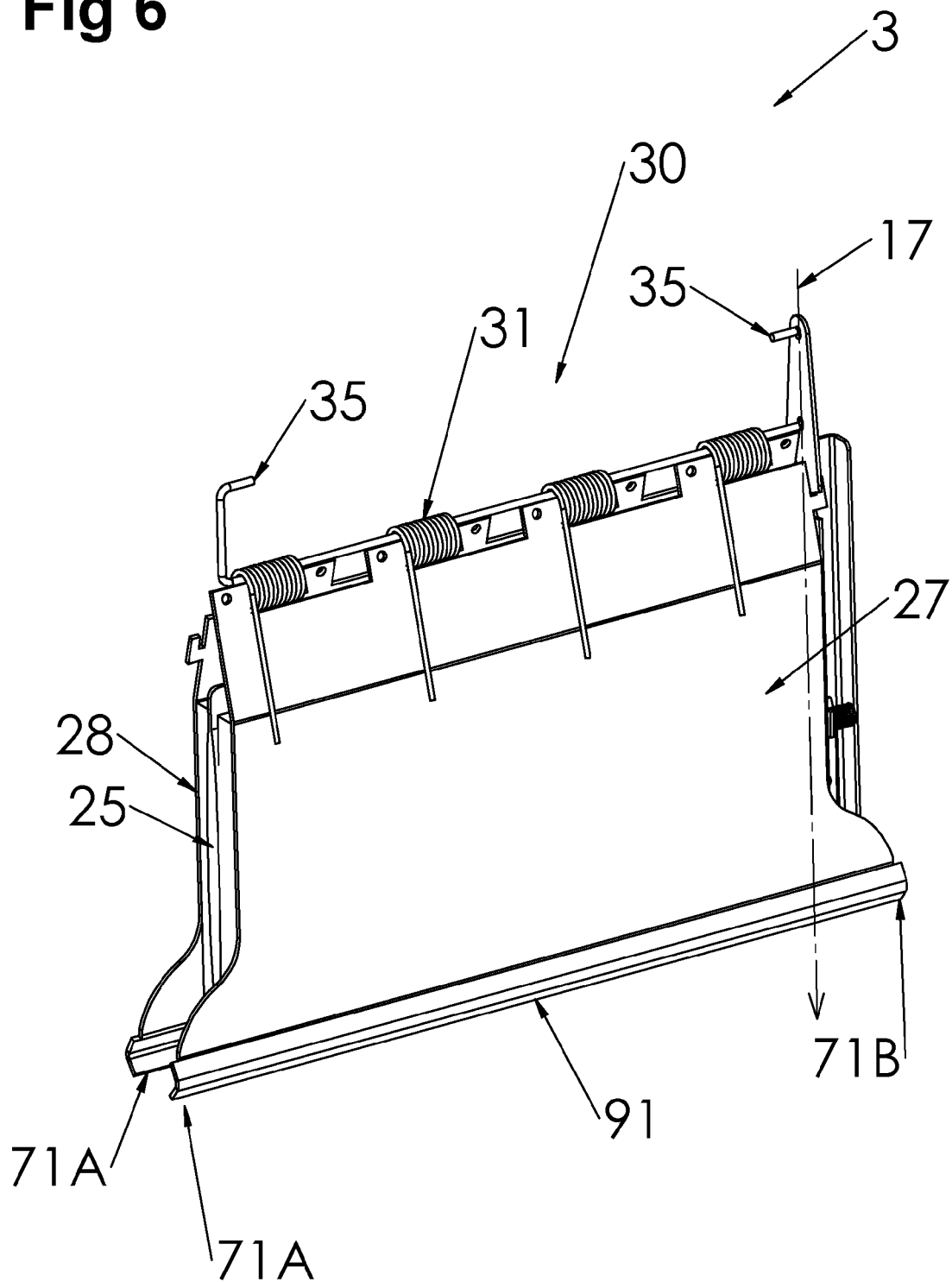
Figure 7:
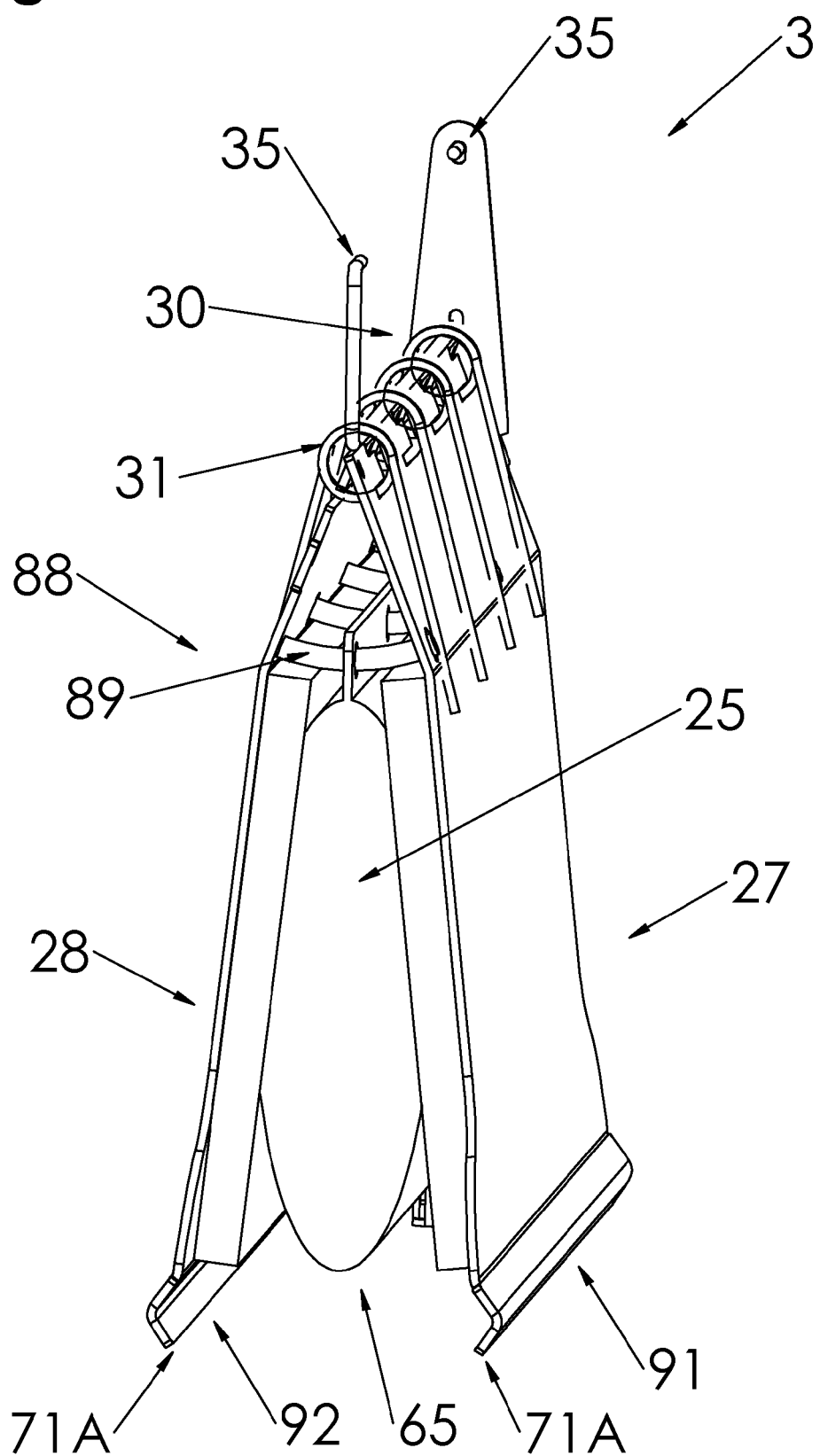

FIG. 4 schematically shows a side view of the colorant fluid dispensing system of FIG. 1. In the embodiment shown, the trajectory 7 extends along a plane 20 and the plane is in use positioned substantially vertical. In said situation, the plane 20 extends under an angle α of 90°. In other examples, the plane 20 extends traverse to the horizontal, such as under an angle α of around 45° with the horizontal 18.

The FIGS. 5-8 show views in perspective of the fluid holder of the colorant fluid dispensing system of FIG. 1. The fluid holder 3 is constructed and arranged to hold a flexible fluid package 25 containing colorant fluid and to apply a pressure to the fluid package to drive the colorant fluid out of the fluid package 25.

The fluid holder 3 comprises a first pressure member 27 and a second pressure member 28 between which in use the fluid package 25. Both pressure members 27, 28 are movable relative to each other. In other examples, only one of the pressure members 27, 28 is moveable relative to the other pressure member. In other examples, only one movable pressure member is provided.

The fluid holder 3 comprises a fluid space 65 for receiving the colorant fluid and the pressure members 27, 28 are constructed and arranged to move such that the volume of the fluid space 65 is reduced. In other examples, only one pressure member is moved to reduce the volume of the fluid space. In other examples, more than two pressure members are moved to reduce the volume of the fluid space.

In the dispensing system shown, the colorant fluid is located in a fluid package 25. In other examples, the colorant fluid is freely held (without a fluid package) in the fluid holders 3.

Figure 8:
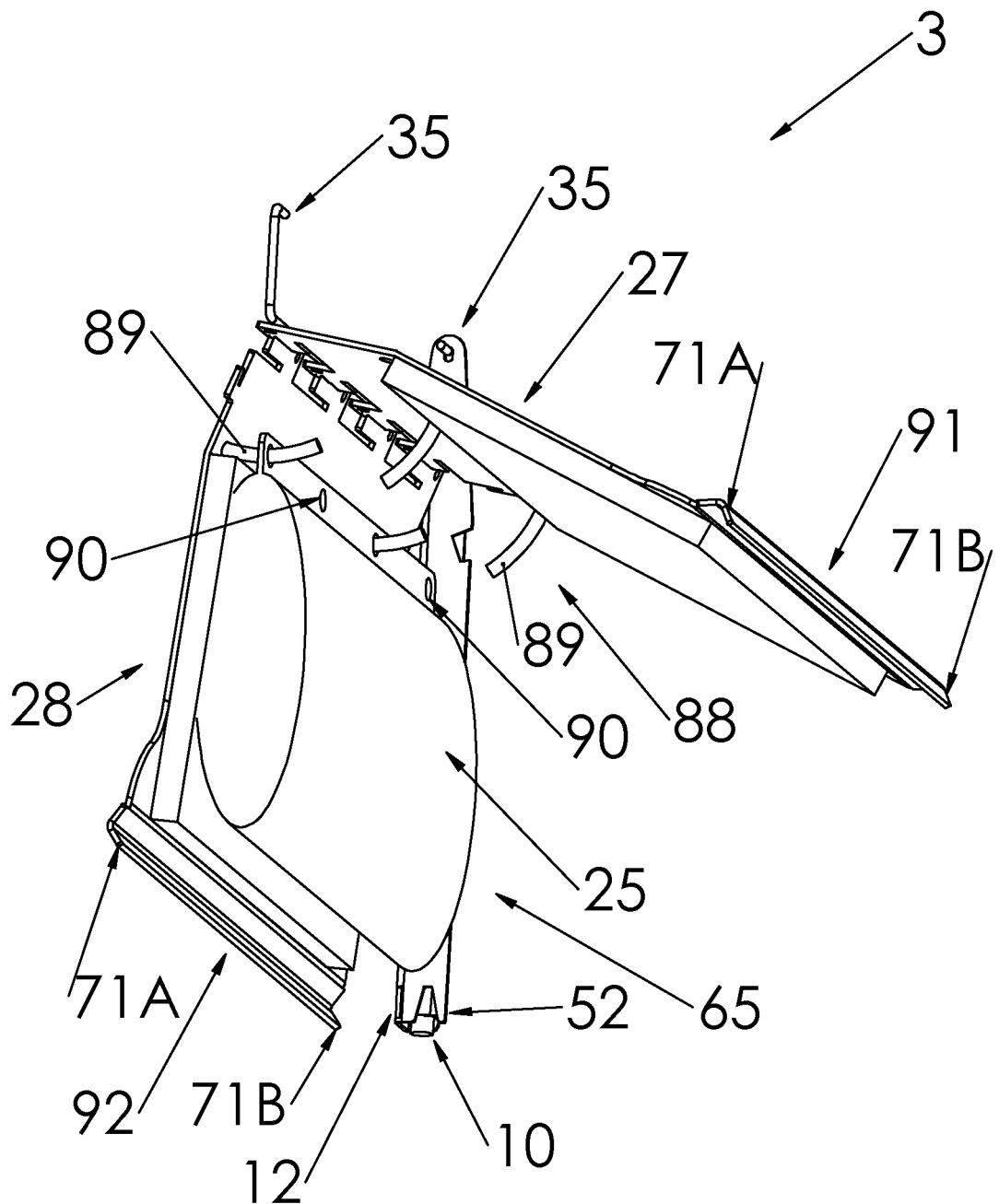

The pressure members 27, 28 are pivotable relative to each other. In FIG. 8 the pressure members 27, 28 are placed at distance from each other in order to obtain an clear view on the inside of the fluid holder 3. The fluid holder 3 comprises an attachment unit 88 constructed and arranged to in use attach the fluid package 25 to the fluid holder 3. In the embodiment shown, the attachment unit 88 comprises attachment bars 89 which in use extend through attachment openings 90 provided on the fluid package. In other examples, the attachment unit 88 comprises a single attachment bar or (elastic or adhesive) restrains to hold the fluid package 25 in the fluid holder 3.

The fluid holder 3 comprises a holder driver 30 to drive the pressure members 27, 28 towards each other. The direction wherein the holder driver 30 drives the pressure members 27, 28 is indicated by the arrows 29.

The holder driver 30 is constructed and arranged to continuously drive the pressure members 27, 28 towards each other. The holder driver 30 is only connected to the fluid holder 3. Besides the connection to the fluid holder 3, the holder driver 30 is free from other connections. The holder driver 30 comprises several springs 31. In other examples, the holder driver 30 comprises a single spring 31. In other examples, other types of holder drivers 30 may be used, such as elastic elements or gas springs.

The fluid holder 3 comprises a holder outlet 10 which in use comprises a fluid connection 11 with the colorant fluid in the fluid package 25. The holder outlet 10 comprises a holder valve 12 which is connected to the fluid connection and placeable in a closed position 13 in which the fluid connection 11 is closed and in an open position 14 in which the fluid connection 11 is open. The dispensing device 4 is constructed and arranged to place the holder valve 12 in the closed position 13 and in the open position 14. A fixating member 52 is provided on the fluid holder 3 to withstand the forces applied by the dispensing device 4 on the holder valve 12 of the fluid holder 3.

The fluid holder 3 comprises two support members 35 to attach the fluid holder 3 to the weight measuring device 32.

The fluid holder 3 comprises two first holder engage members 71A and two second holder engage members 71B. More specifically, each of the pressure members 27, 28 comprises a first holder engage members 71A and a second holder engage members 71B. To attach the fluid holder 3 to the holder transporter 6, the first holder engage members 71A engage one of the first attachment members 58A of the first rotation plate 55A and the second holder engage members 71B engage a corresponding second attachment member 58B of the second rotation plate 55B. Due to the continuously acting driving force of the holder driver 30 driving the pressure members 27, 28 towards each other, the fluid holder 3 is held in a fixed position relative to the first rotation plate 55A and is thereby attached to the holder transporter 6. When the fluid holder 3 is attached to the holder transporter 6, the pressure members 27, 28 do not apply a pressure on the fluid package 25. The attachment unit 88 holds the fluid package 25 inside the fluid holder 3. The first holder engage members 71A and the second holder engage members 71B are formed by the lower rims 91 of the pressure members 27, 28. In other examples, the first holder engage members 71A and the second holder engage members 71B are located at a different location. In other examples the fluid holders 6 can be attached in a different manner to the holder transporter 6, such as by a static mechanical coupling, a snap connection or a friction connection.

The FIGS. 9-17 show views of an operation of the colorant fluid dispensing system of FIG. 1. Several parts of the dispensing system 1 are removed in order to obtain a clear view on the inside. For example, only one fluid holder 3 is shown.

Figure 9:
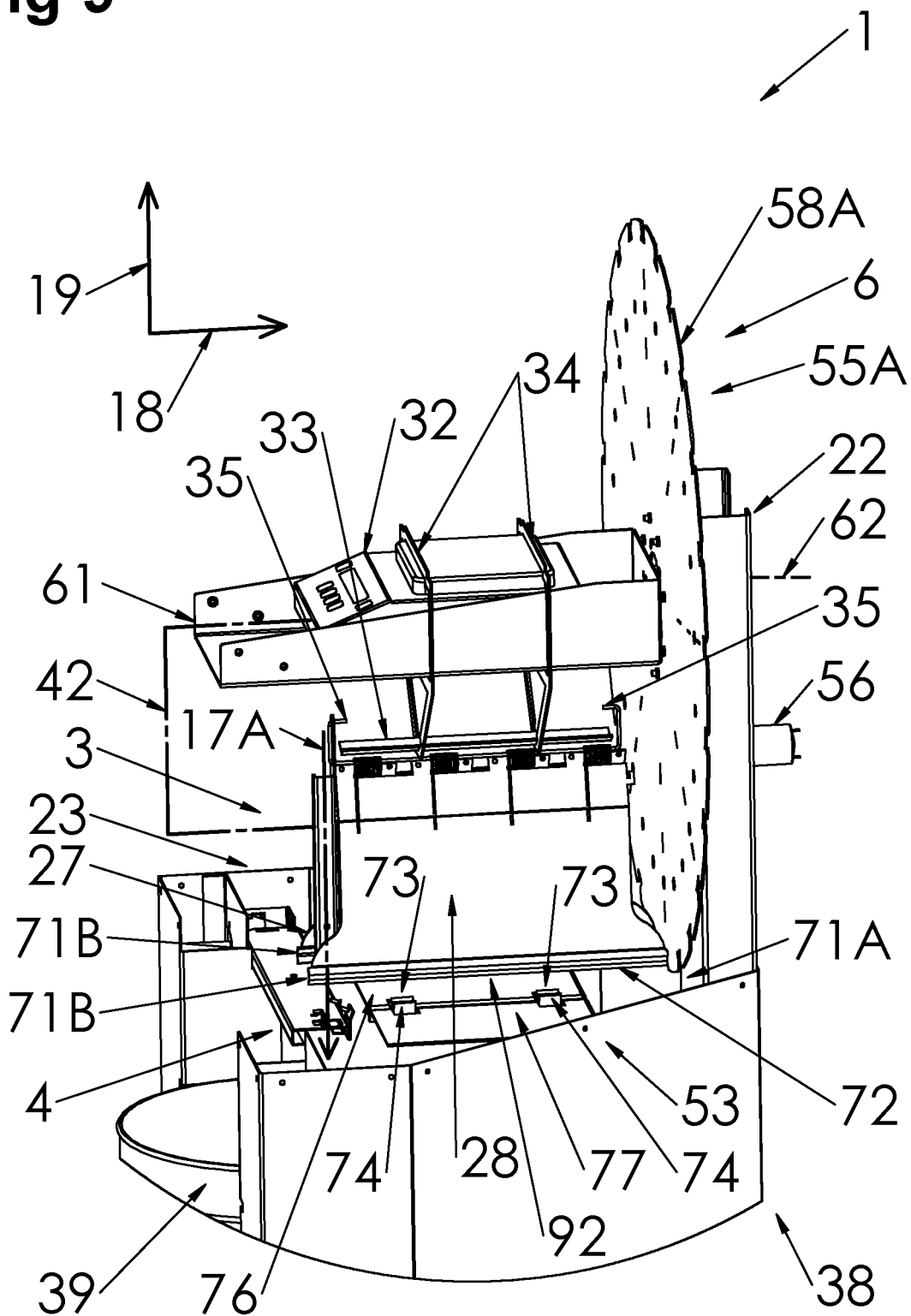
Figure 10:
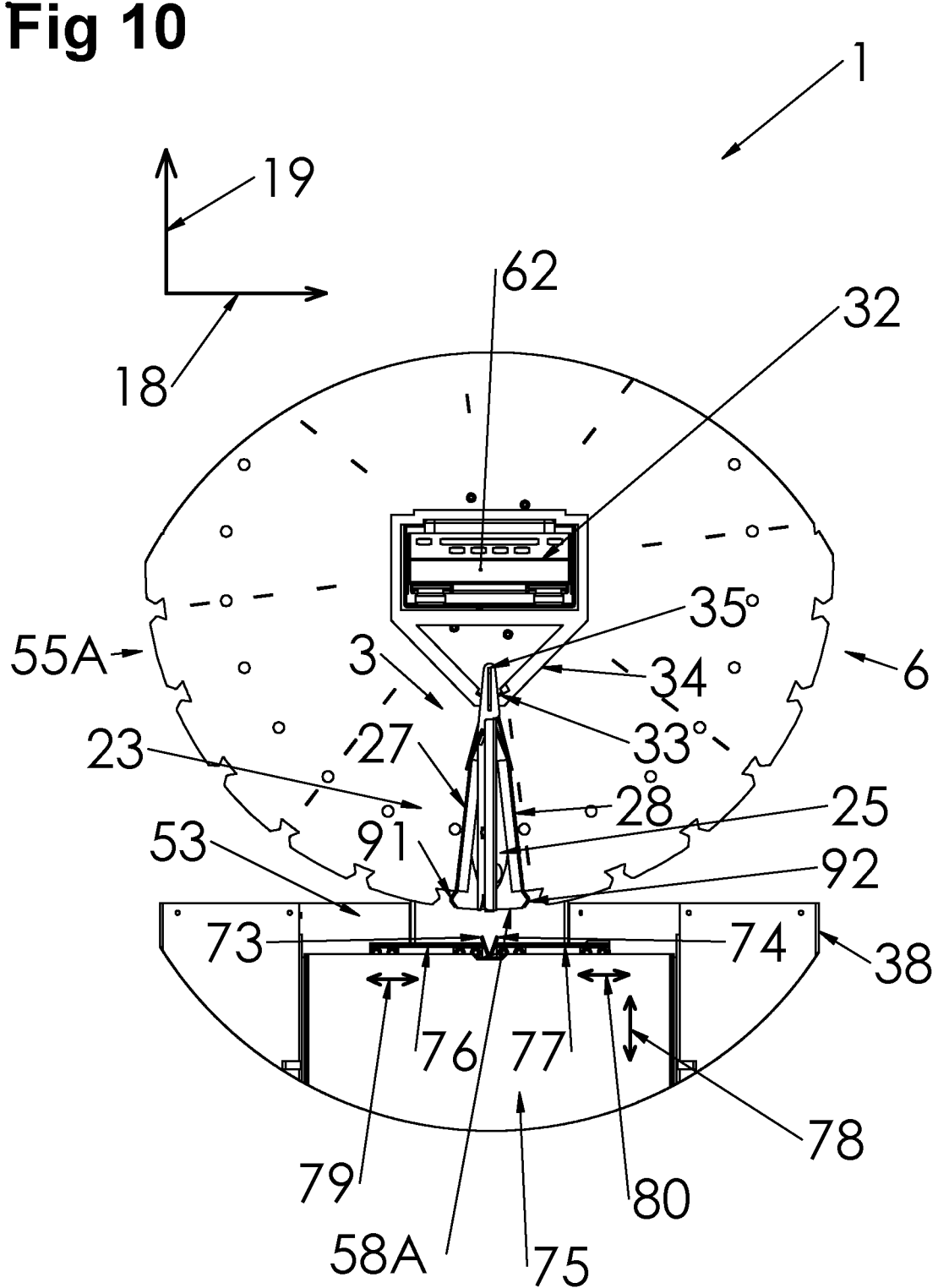

In the FIGS. 9 and 10, the first holder engage members 71A of the fluid holder 3 engage one of the attachment members 58A of the first rotation plate 55A. The holder transporter 6 is constructed and arranged to position the fluid holders 3 in a transfer position 23 allowing the fluid holders 3 to be transferred from the holder transporter 6. The fluid holder 3 shown is positioned in the transfer position 23.

The weight measuring device 32 is located above the fluid holder 3. The weight measuring device 32 is positioned on a device support 61 which is connected to the first support beam 22 and the second support beam 26 (not shown in FIG. 9-17). A measuring support 33 is connected to the weight measuring device 32 via two connectors 34. The support members 35 of the fluid holder 3 are located at a distance from the measuring support 33.

A transfer device 53 is located below the fluid holder 3. The transfer device 53 is constructed and arranged to transfer the fluid holders 3 located in the transfer position 23 into the dispensing position 24 and back to the holder transporter 6 into the transfer position 23. The fluid holder 3 located in the dispensing position 24 is uncoupled from the holder transporter 6. In the dispensing position 24, the fluid holder 3 is located at a distance from the holder transporter 6. The transfer device 53 comprises a first movable unit 76 provided with a first transfer engage member 73 and a second movable unit 77 provided with a second transfer engage member 74. The first movable member 76 is movable in the horizontal direction as indicated by arrow 79 and the second movable unit 77 is movable in the horizontal direction as indicated by arrow 80. The transfer device 53 comprises a movable transfer support 75 on which the first movable unit 76 and the second movable unit 77 are located. The movable transfer support 75 is movable in the vertical direction as indicated in by arrow 78. The transfer device 53 is located at a distance from the fluid holder 3. The transfer engage members 73, 74 are positioned near each other and at a distance from the fluid holder 3.

Figure 11:
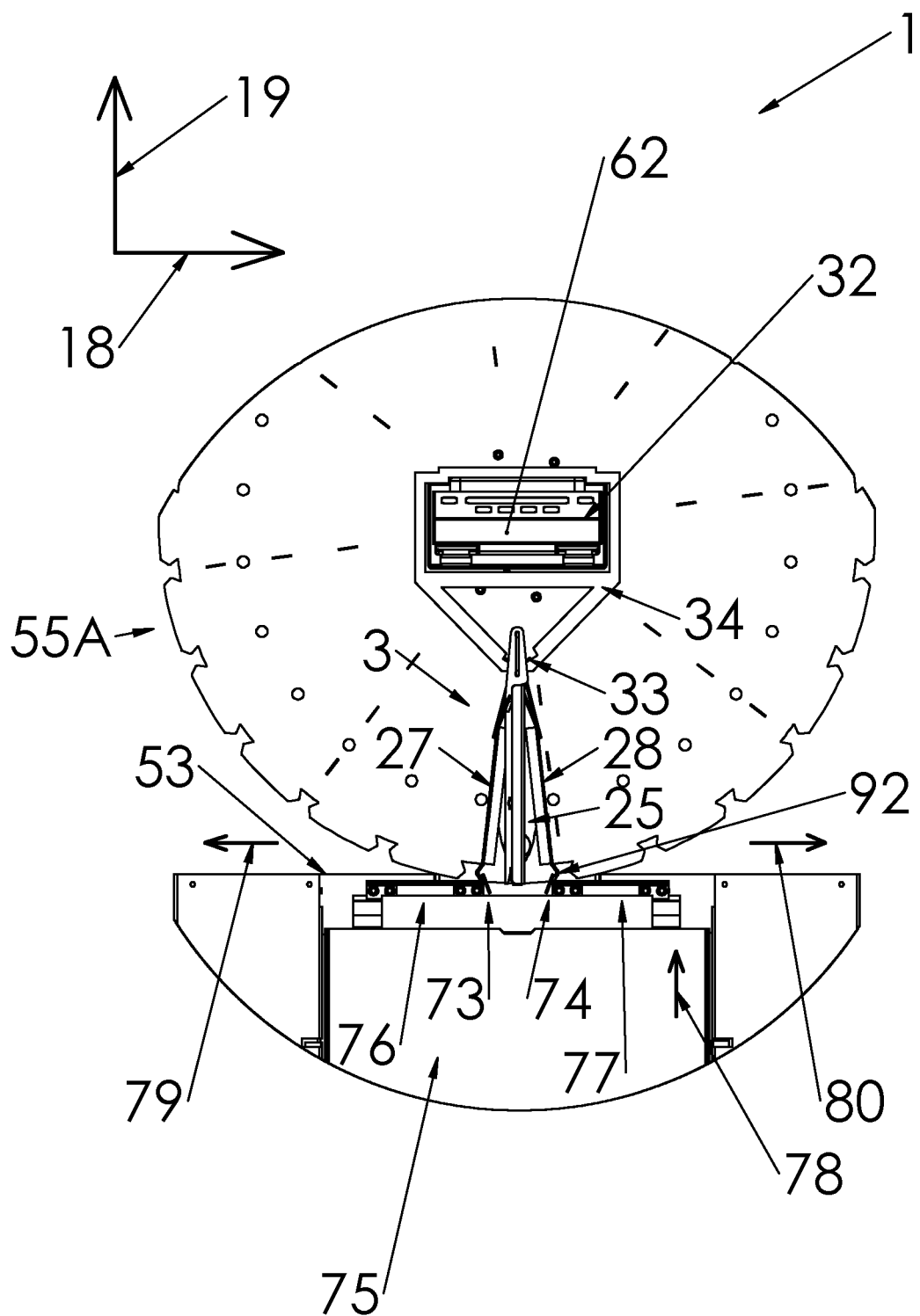

In FIG. 11, the movable transfer support 75 is moved in a upwards direction as indicated by arrow 78 such that the transfer engage members 73, 74 are positioned between the pressure members 27, 28 of the fluid holder 3. The transfer engage members 73, 74 are positioned between the lower rims 91, 92 of the pressure members 27, 28. The first movable unit 76 is moved in a substantially horizontal direction as indicated by arrow 79 and the second movable unit 77 is moved in an opposite substantially horizontal direction as indicated by arrow 80. The transfer engage members 73, 74 are moved outwards and engage the pressure members 27, 28. The transfer engage members 73, 74 are moved further outwards such that the pressure members 27, 28 lose their engagement with the first attachment member 58A and that the pressure members 27, 28 subsequently remain engaging the transfer engage members 73, 74 to attach the fluid holder 3 to the transfer device 75.

Figure 12:
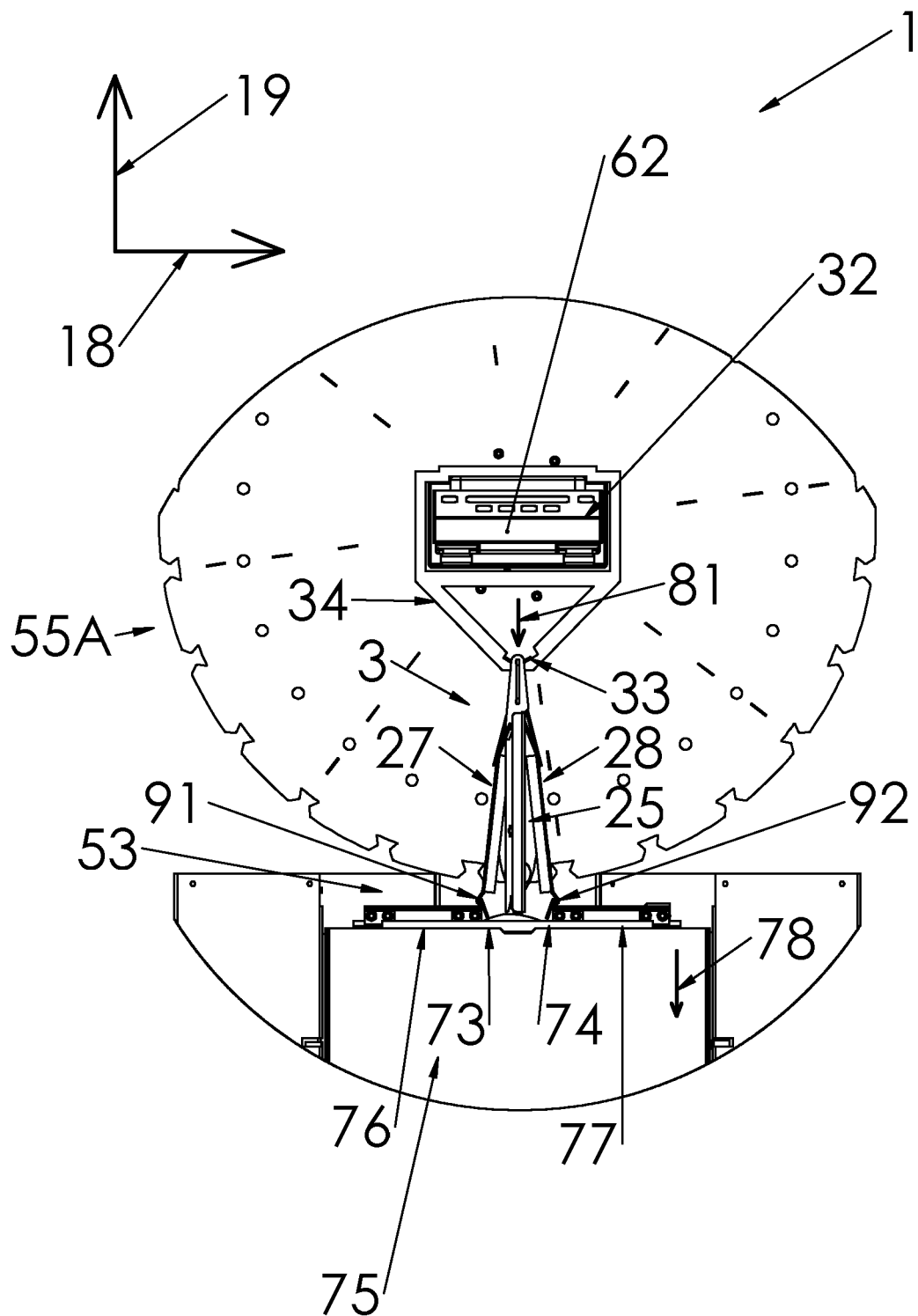

In FIG. 12, the fluid holder 3 is released from the first rotation plate 55A and attached to the transfer device 53. The transfer device 53 is moved downwards as indicated by arrow 78. As a result thereof, the fluid holder 3 attached to the transfer device 53 is also moved downwards as indicated by arrow 81. The fluid holder 3 is moved such that the support members 35 are positioned on the measuring support 33.

Figure 13:
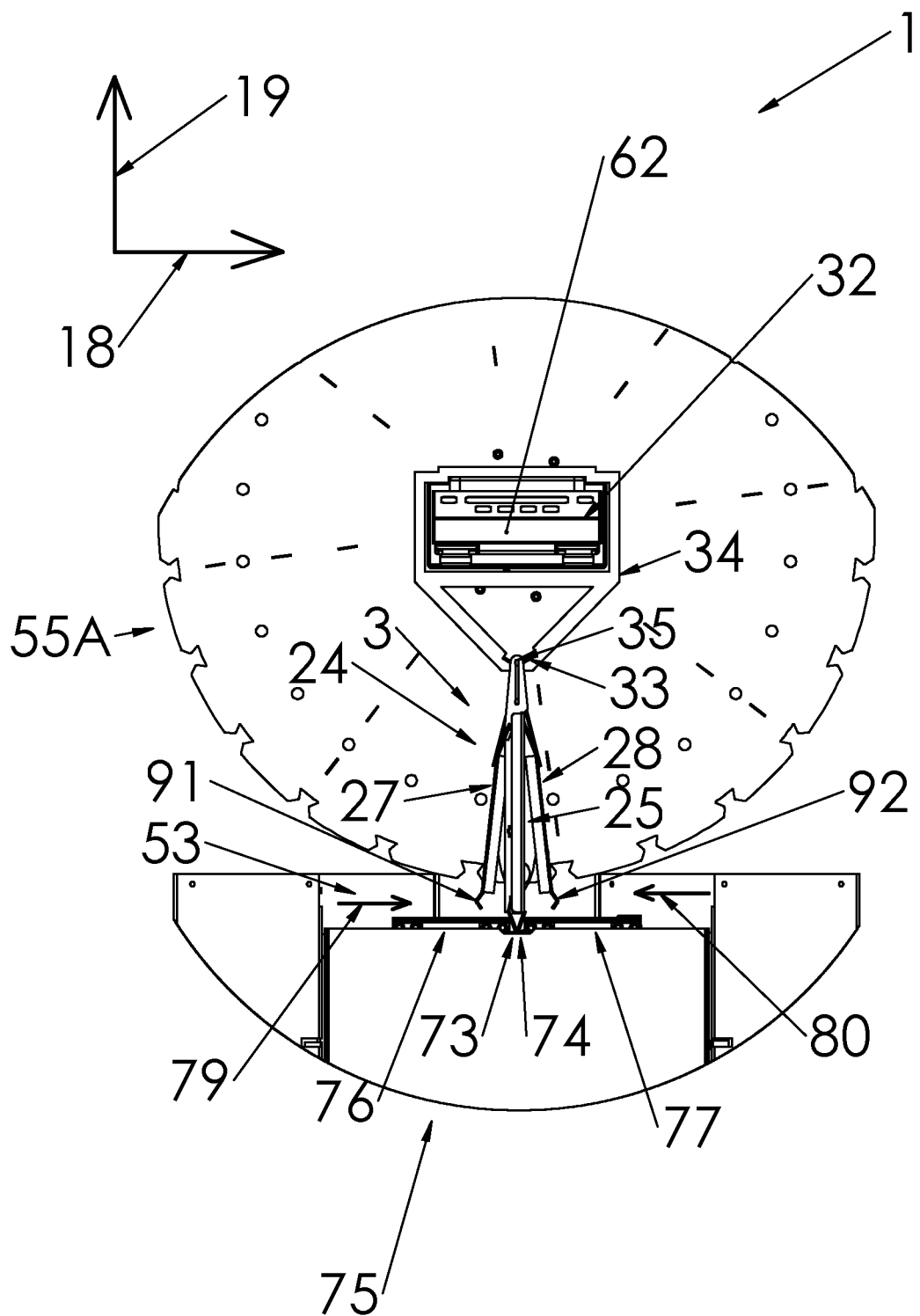
Figure 14:
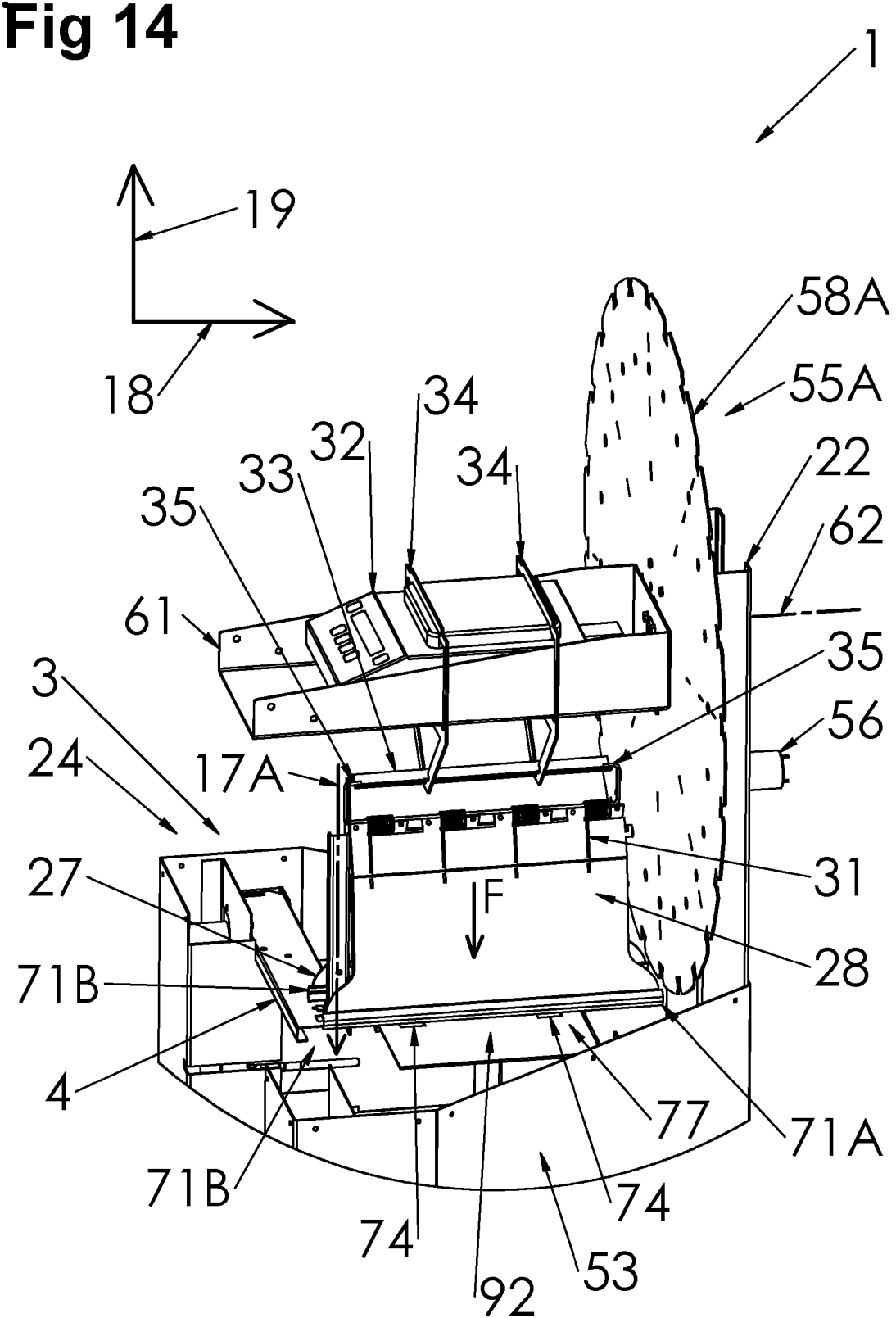

In the FIGS. 13 and 14, the transfer engage members 73, 74 are moved toward each other as indicated by the arrows 79 and 80. As a result of this, the pressure members 27, 28 move towards each other until the pressure members 27, 28 come in contact with the fluid package 25 located inside the fluid holder 3. Due to the holder driver 30, the pressure members 27, 28 exert a force to the fluid package 25. This results in an overpressure in the colorant fluid inside the fluid package 25.

The colorant fluid does not flow out of the holder outlet 10 because the holder valve 12 (see FIG. 5-8) is closed. The holder valve 12 is constructed and arranged to be in a closed position 13 when not activated and to be in a open position 14 when activated. The dispensing device 4 is constructed and arranged to activate the holder valve 12 such that the holder valve 12 can be placed in the closed position 13 and in the open position 14.

The fluid holder 3 is now located in the dispensing position 24. The fluid holder 3 is supported by the weight measuring device 32 via the measuring support 33. The weight of the fluid holder 3 is schematically indicated by the arrow F. The fluid holder 3 is in the vertical direction supported by the weight measuring device 32. The weight changes of the fluid holder 3 holding colorant fluid are measured by the weight measuring device 32 via said support in vertical direction.

Figure 18:
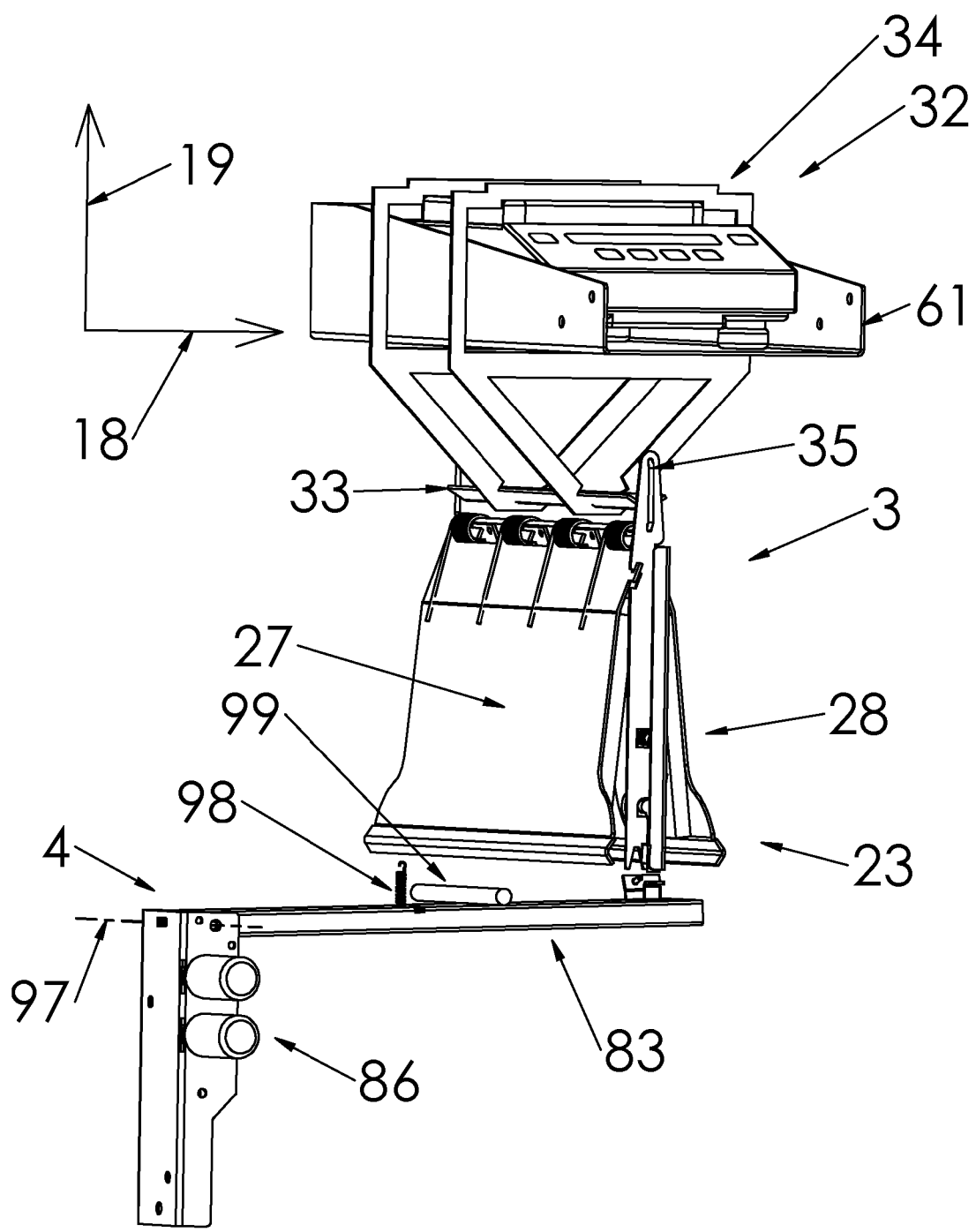
Figure 19:
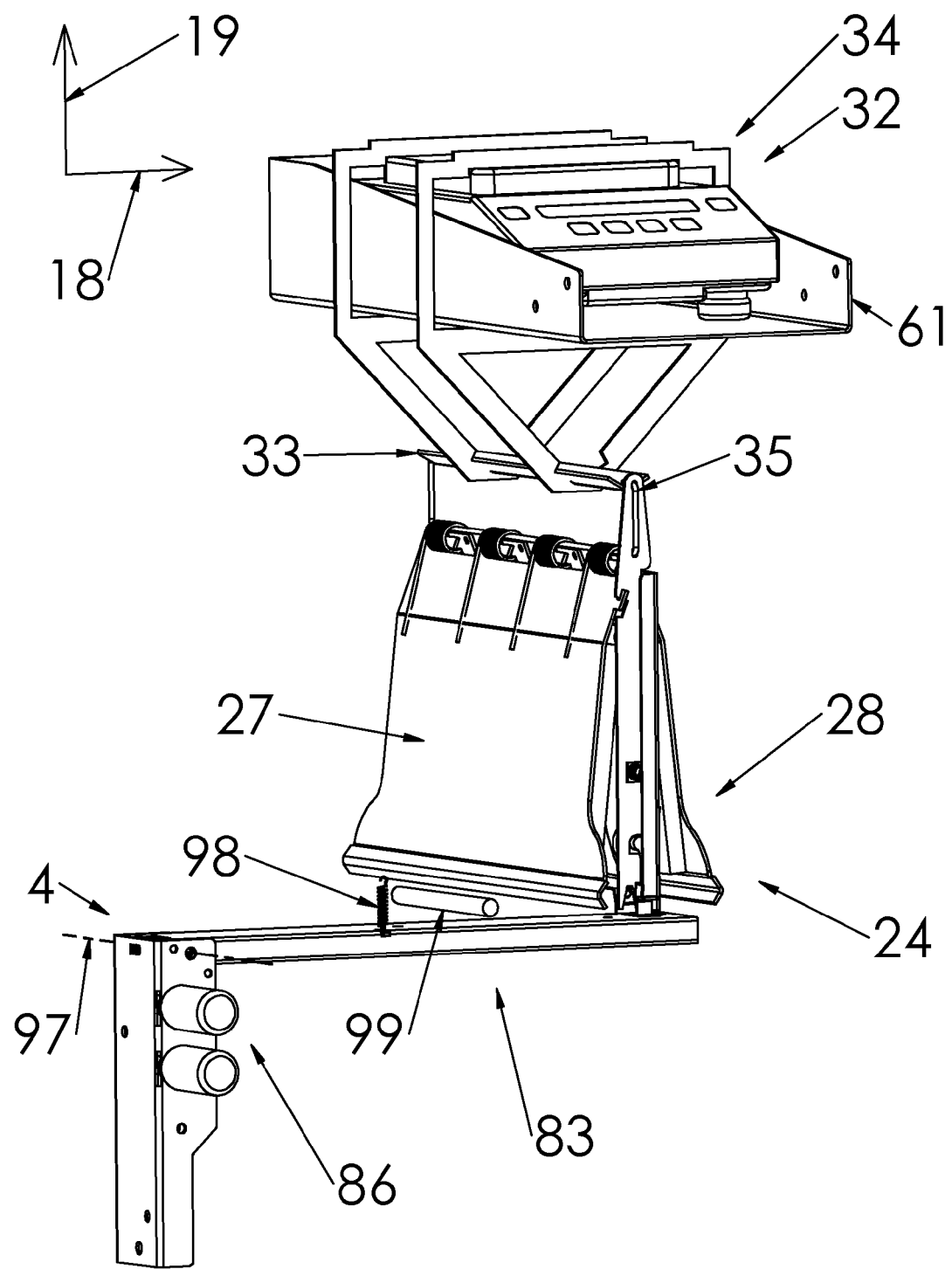

FIG. 18 schematically shows the fluid holder 3 in the transfer position 23 and FIG. 19 shows the same view wherein the fluid holder 3 is located in the dispensing position 24. The dispensing system 1 is constructed and arranged to, apart from the force applied by the weight measuring device 32, in the vertical direction only apply a constant force to the fluid holder 3 from which colorant fluid is dispensed.

The dispensing device 4 comprises a dispensing support 83 constructed and arranged to apply a constant vertical force to the fluid holder 3 located in the dispensing position 24. The dispensing support 83 is pivotable about a pivot axis 97. The dispensing support 83 is driven upwards in the vertical direction by a support driver 98. Said upwards vertical movement of the dispensing support 83 is limited by a blocking member 99. The support driver 98 and the blocking member 99 are (directly or indirectly) connected to the base structure 38 (not shown). The support driver 98 drives the dispensing support 83 with a constant force.

In FIG. 18, the fluid holder 3 positioned in the transfer position 23 is located at a distance from the dispensing support 83 positioned in the most upper position and in contact with the blocking member 99.

In FIG. 19, the fluid holder 3 positioned in the dispensing position 24 is placed in contact with the dispensing support 83. The fluid holder 3 is supported by the dispensing support 83 and the weight measuring device 32 (via the measuring support 33). When compared with FIG. 18, the dispensing support 83 is moved downwards at a distance from the blocking member 99.

The dispensing support 83 applies a constant vertical force to the fluid holder 3. The constant vertical force of the dispensing support 83 does not lead to miscalculations in the measuring of weight changes of the fluid holder 3 dispensing colorant fluid. In one aspect of the dispensing system 1 shown, the constant vertical force tends to allow a wider measuring range available for dispensing by reducing the weight on the weight measuring device 32. This allows a more accurate measuring of the amount of colorant fluid dispensed by the fluid holder 3. In one aspect of the dispensing system 1 shown, the support driver 98 tends to provide a simple and cost efficient manner to keep the dispensing support 83 and the fluid holder 3 in contact with each other during the dispensing of colorant fluid from said fluid holder 3.

The constant vertical force of the dispensing support 83 compensates around 50% of the weight of the fluid holder 3 holding the colorant fluid.

The dispensing support 83 forms a vertical support for the fluid holder 3 in the dispensing position 24. In other examples, the constant vertical force is applied by a vertical support not being part of the dispensing device 4. In other examples of the dispensing system 1, a different percentage of the weight of the fluid holder 3 holding the colorant fluid is compensated. In other examples, the constant vertical force of the vertical support compensates around 75% of the weight of the fluid holder 3 holding the colorant fluid. In other examples, the constant vertical force of the vertical support compensates around 25% of the weight of the fluid holder 3 holding the colorant fluid.

In other examples of the dispensing system 1, the dispensing support 83 is latched to the fluid holder 3, e.g. with a magnet, located in the dispensing position 24 and the dispensing support 89 applies substantially no vertical force to fluid holder 3.

In other examples, the dispensing system is constructed and arranged such that the weight measuring device is the only support in the vertical direction of the fluid holder from which colorant fluid is dispensed.

The weight measuring device 32 communicates with the controlling device 9 (FIG. 3) via the second communication connection 42. The weight measuring device 32 is constructed and arranged to measure the weight changes of the fluid holder 3 during the dispensing of the colorant fluid from said fluid holder 3. The weight measuring device 32 measures the weight of the fluid holder 3 positioned in the dispensing position 24. The controlling device 9 comprises a calculator 16 (FIG. 3) constructed and arranged to calculate weight changes of the fluid holder 3 holding colorant fluid and supported by the weight measuring device 32. The calculator 16 calculates weight changes of the fluid holder 3 during the dispensing of the colorant fluid from said fluid holder 3.

In one aspect of the dispensing system 1, the dispensing system 1 tends to be more accurate in measuring weight changes of the fluid holders 3 from which colorant fluid is dispensed.

Figure 15:
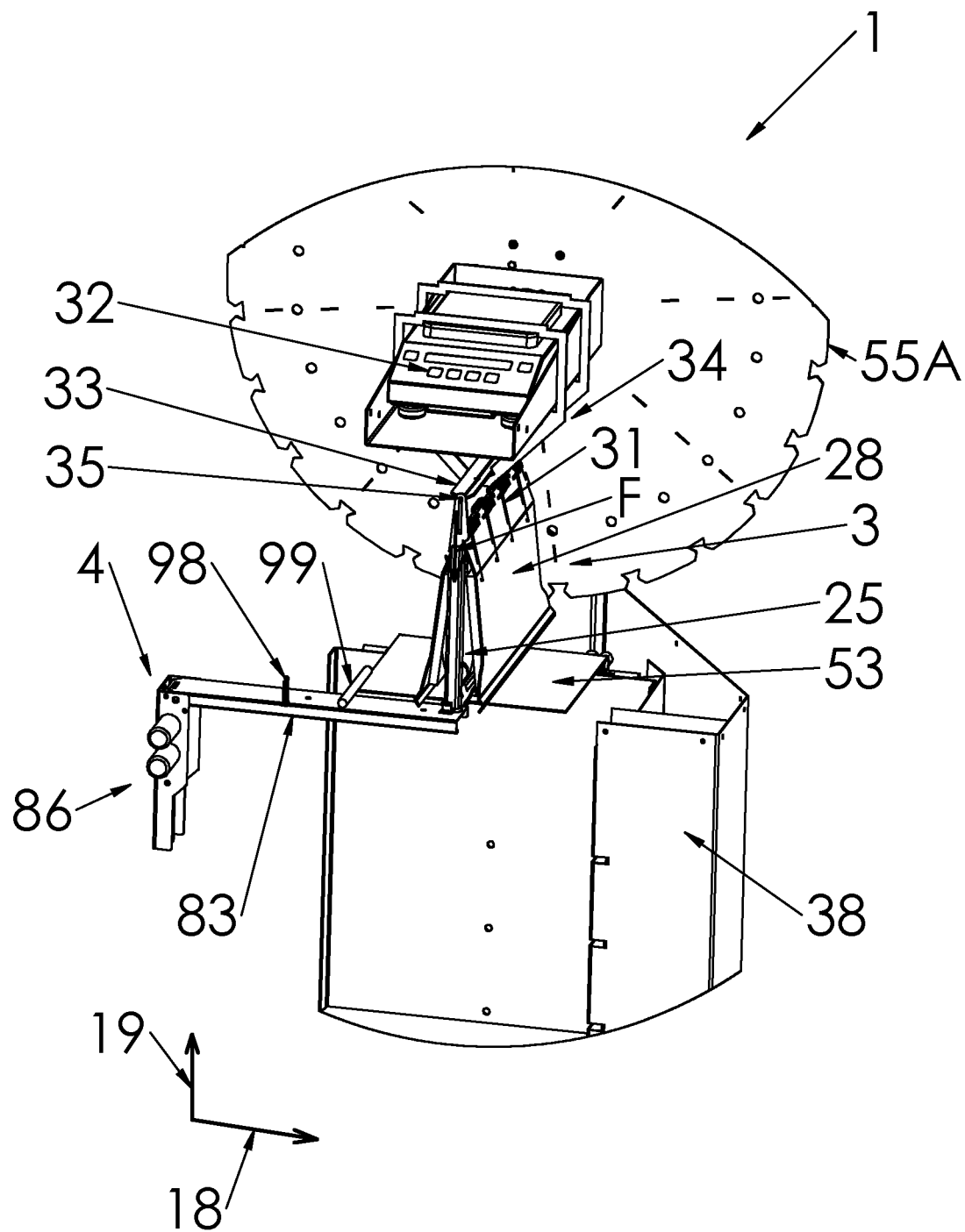
Figure 16:
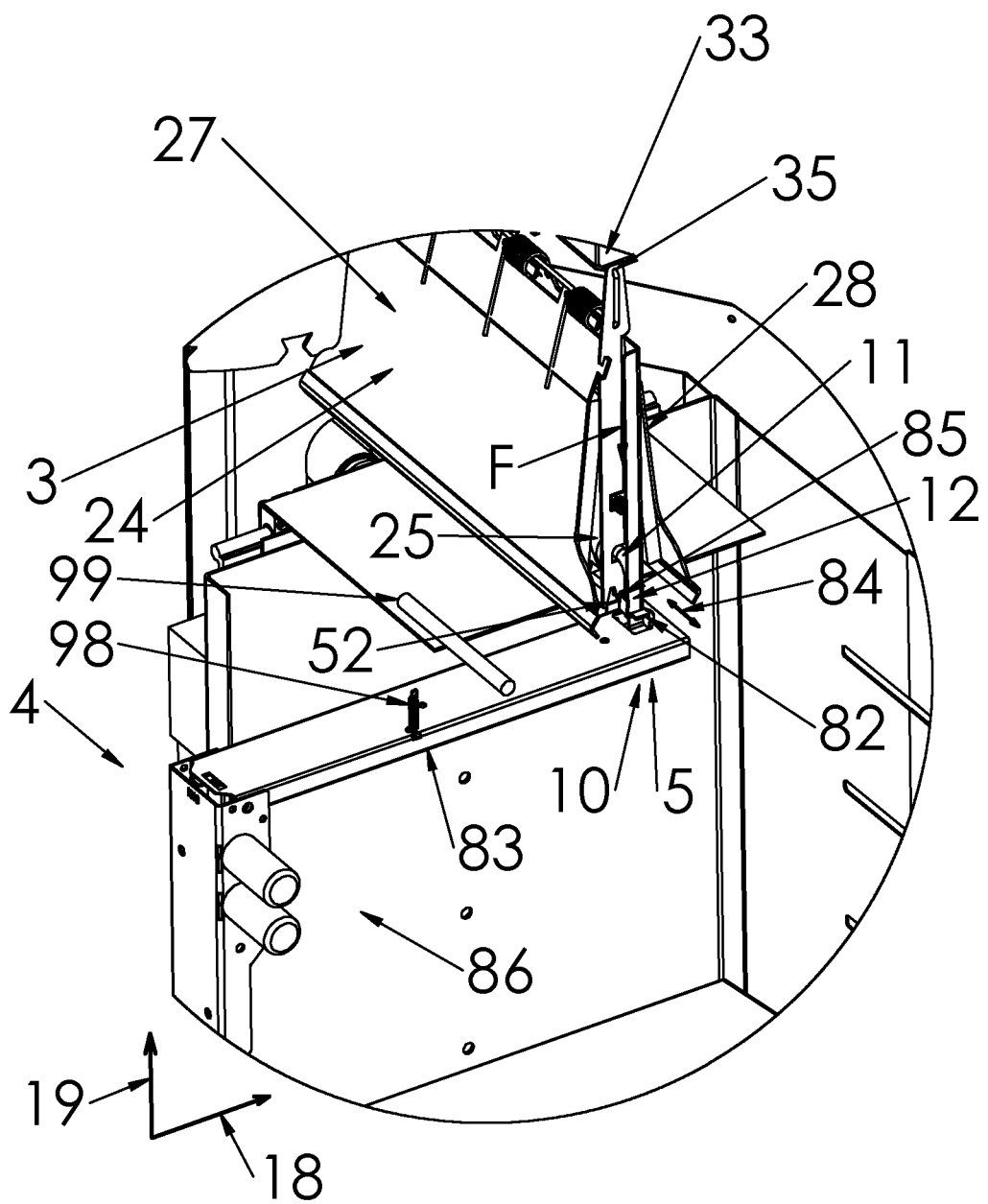
Figure 17:
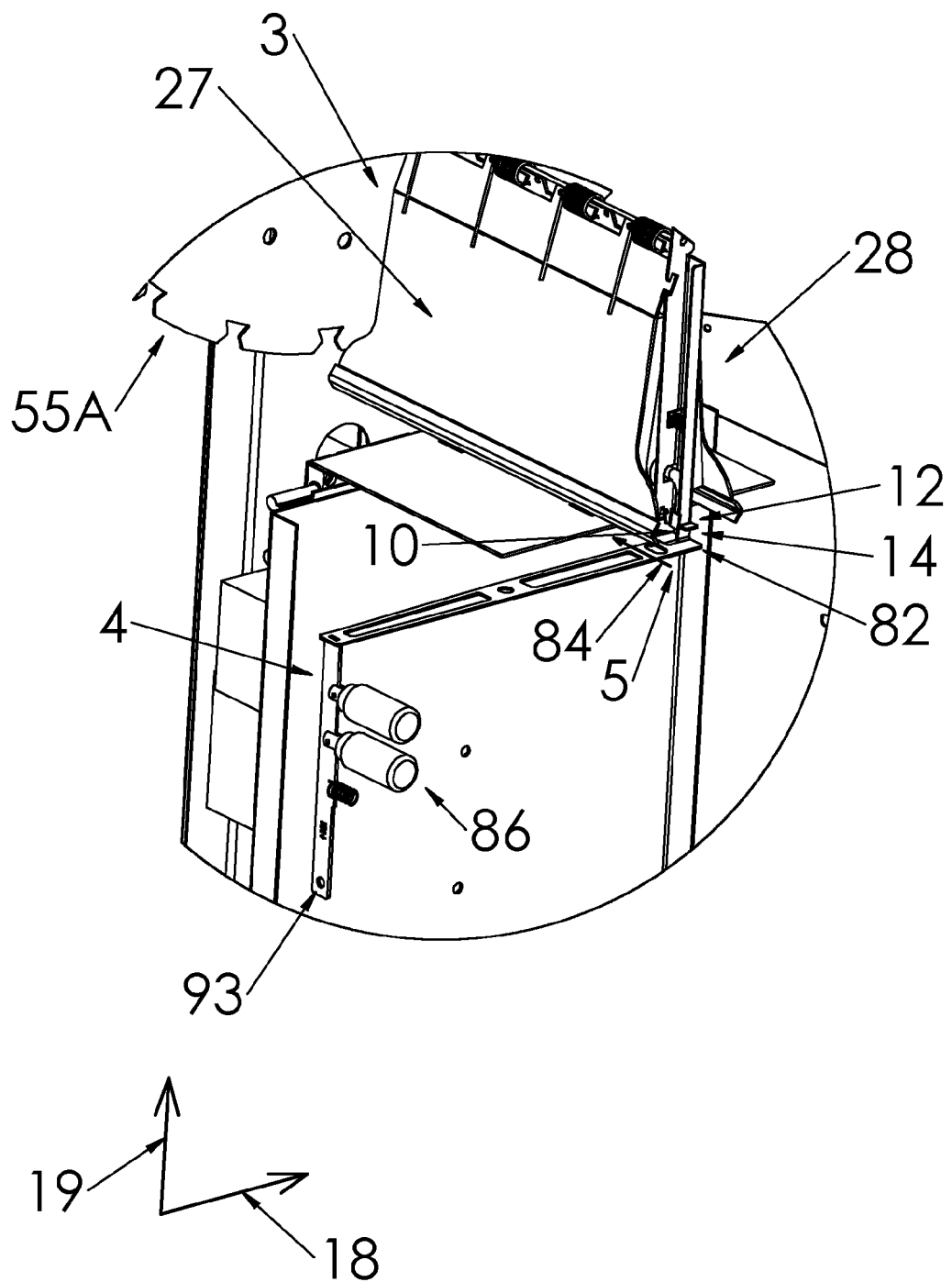

In the FIGS. 15-17, the dispensing device 4 activates the holder valve 12 of a fluid holder 3 positioned in the dispensing position 24 to dispense colorant fluid from the fluid package 25 held by the fluid holder 3.

The dispensing device 4 is constructed and arranged to place the holder valve 12 of a fluid holder 3 located in the dispensing position in the open position 14 and back in the closed position 13. The dispensing device 4 is constructed and arranged to in use apply only a force on the fluid holder 3 in a horizontal direction.

The dispensing device 4 comprises a valve actuator 82 constructed and arranged to interact with the holder valve 12. An actuator drive 86 is provided to move the valve actuator 82 relative to the fluid holder 3 held in the dispensing position 24.

The back and forth movements of the valve actuator 82 is indicated by arrow 84 of FIG. 16. Said movements of the valve actuator 82 are only in horizontal directions.

The dispenser support 83 of the dispensing device 4 is constructed and arranged to in the horizontal direction remain in a stationary position relative to the fluid holder 3 held in the dispensing position 24. The fixating member 52 of the fluid holder 3 from which the colorant fluid is dispensed is placed in contact with the dispensing support 83. The dispenser support 83 is (directly or indirectly) connected to the base structure 38. The dispenser support 83 is pivotable connected to the base structure 38 to allow a pivot movement in the vertical direction. The dispenser support 83 is pivotable about the horizontal pivot axis 97. The fixating member 52 of the fluid holder 3 interacts with the dispenser support 83 during the dispensing of the colorant fluid by the fluid holder 3. The dispenser support 83 supports the fixating member 52 to fixate the fluid holder 3 in the horizontal direction in order to withstand forces applied by the valve actuator 82 on the holder valve 12 of the fluid holder 3.

The dispensing support 83 forms a horizontal support for the fluid holder 3 in the dispensing position 24. In other examples, the horizontal support is not part of the dispensing device 4.

In FIG. 17, the dispenser support 83 is removed in order to obtain a clear view on the valve actuator 82. The valve actuator 82 is (directly or indirectly) connected to the base structure 38 via a pivot connection 93 which allows the movements of the valve actuator 82. The movement of the valve actuator 82 for placing the holder valve 12 in the open position 14 is indicated by arrow 84 of FIG. 17. For placing the holder valve 12 back in the closed position 13, the valve actuator 82 is moved back in the opposite direction.

When the holder valve 12 is opened, colorant fluid will flow out of the holder outlet 10 due to the overpressure in the fluid package 25, which overpressure is caused by the force of the member drive 30 acting on the fluid package 25 via the pressure members 27, 28. The holder outlet 10 of the fluid holder 3 positioned in the dispensing position 24 defines the system outlet 5 of the dispensing system 1.

The controlling device 9 is constructed and arranged to control the dispensing device 4 on basis of data provided by the weight measuring device 32.

In one aspect of the dispensing system 1, the dispensing system 1 tends to be more accurate in dispensing a specific amount of colorant fluid.

After the right amount of colorant fluid is dispensed from the fluid package 25, the fluid holder 3 is placed back into the holder transporter 6 by the transfer device 53. This is done by performing the steps of the FIGS. 9-14 in reverse order. The transfer device 53 places the fluid holder 3 from the dispensing position 24 into the transfer position 23. Once back in the transfer position 23, the fluid holder 3 is again attached to the rotation plates 55. On command of the controlling device 9, the holder transporter can subsequently move the fluid holders 3 along the trajectory 7 in order to place a different fluid holder 3 in the transfer position 23 for dispensing the colorant fluid held by said fluid holder 3. This way the right amount of the required colorant fluids can be dispensed by the dispensing system 1 for in example giving the paint in the paint container 39 a specific colour.

Examples of the colorant fluid device are given. The following clauses are offered as further description.

1. Colorant fluid dispensing system for dispensing multiple colorant fluids, wherein said dispensing system comprises;
    more than one fluid holder for holding a colorant fluid, and
    a dispensing device for dispensing the colorant fluids held by the fluid holders out of a system outlet, wherein
        the dispensing system comprises a holder transporter for transporting the fluid holders along a trajectory,
        the holder transporter is constructed and arranged to change the orientation of the fluid holders to achieve a mixing effect in the colorant fluids held by the fluid holders.

2. Dispensing system according to clause 1, wherein
    the dispensing system comprises a weight measuring device constructed and arranged to measure weight changes of the fluid holder during the dispensing of the colorant fluid from said fluid holder, and
    the fluid holder is constructed and arranged to drive the colorant fluid out of said fluid holder.

3. Colorant fluid dispensing system for dispensing multiple colorant fluids, wherein said dispensing system comprises;
    more than one fluid holder for holding a colorant fluid, and
    a dispensing device for dispensing the colorant fluids held by the fluid holders out of a system outlet, wherein
        the dispensing system comprises a weight measuring device constructed and arranged to measure weight changes of the fluid holder during the dispensing of the colorant fluid from said fluid holder, and
        the fluid holder is constructed and arranged to drive the colorant fluid out of said fluid holder.

4. Dispensing system according to clause 3, wherein
    the dispensing system comprises a holder transporter for transporting the fluid holders along a trajectory,
    the holder transporter is constructed and arranged to change the orientation of the fluid holders to achieve a mixing effect in the colorant fluids held by the fluid holders.

5. Dispensing system according to any of the preceding clauses, wherein the dispensing system comprises a controlling device constructed and arranged to control the operation of the dispensing system.

6. Dispensing system according to any of the preceding clauses, wherein the fluid holder comprises a holder outlet which in use comprises a fluid connection with the colorant fluid, the holder outlet comprises a holder valve which is connected to the fluid connection and placeable in a closed position in which the fluid connection is closed and in an open position in which the fluid connection is open.

7. Dispensing system according to any of the preceding clauses, wherein the dispensing device is constructed and arranged to place the holder valve in the closed position and in the open position.

8. Dispensing system according to any of the preceding clauses, wherein the holder transporter is constructed and arranged to in use hold the fluid holders in a first orientation in which an orientation line extending through the fluid holders is oriented in a downwards vertical direction and to change the orientation of the fluid holders into a second orientation wherein the orientation line is oriented in a different orientation than said downwards vertical direction.

9. Dispensing system according to any of the preceding clauses, wherein in the second orientation the orientation line is oriented traverse relative to said downwards vertical direction.

10. Dispensing system according to any of the preceding clauses, wherein in the second orientation the orientation line is oriented under an angle of at least 90° relative to said downwards vertical direction.

11. Dispensing system according to any of the preceding clauses, wherein in the second orientation the orientation line is oriented under an angle of around 180° relative to said downwards vertical direction.

12. Dispensing system according to any of the preceding clauses, wherein the trajectory extends along a plane and the plane is in use positioned traverse to the horizontal.

13. Dispensing system according to any of the preceding clauses, wherein the plane in use is positioned under an angle of at least 45° with the horizontal.

14. Dispensing system according to any of the preceding clauses, wherein the plane in use is positioned substantially vertical.
15. Dispensing system according to any of the preceding clauses, wherein the holder transporter is constructed and arranged to change the orientation of the fluid holders during the transportation of the fluid holders along the trajectory.
16. Dispensing system according to any of the preceding clauses, wherein the trajectory is an endless trajectory.
17. Dispensing system according to any of the preceding clauses, wherein the trajectory is circular.
18. Dispensing system according to any of the preceding clauses, wherein the holder transporter is constructed and arranged to rotate the fluid holders around a rotation axis.
19. Dispensing system according to any of the preceding clauses, wherein the holder transporter is constructed and arranged to position the fluid holders near the system outlet.
20. Dispensing system according to any of the preceding clauses, wherein the controlling device is constructed and arranged to activate the holder transporter during time periods wherein no colorant fluid is dispensed.
21. Dispensing system according to any of the preceding clauses, wherein the controlling device is constructed and arranged to activate the holder transporter when the fluid holders have not been moved along the trajectory for a predetermined time period.
22. Dispensing system according to any of the preceding clauses, wherein the holder transporter is constructed and arranged to change the orientation of the fluid holders to reduce the settling of particles in the colorant fluids held by the fluid holders.
23. Dispensing system according to any of the preceding clauses, wherein the holder transporter is constructed and arranged to change the orientation of the fluid holders to prevent the settling of particles in the colorant fluids held by the fluid holders.
24. Dispensing system according to any of the preceding clauses, wherein the holder transporter is constructed and arranged to change the orientation of the fluid holders to ensure that the colorant fluids held by the fluid holders are substantially homogeneous.
25. Dispensing system according to any of the preceding clauses, wherein the dispensing system comprises a container support constructed and arranged to hold a paint container below the system outlet.
26. Dispensing system according to any of the preceding clauses, wherein the distance between the container support and the system outlet is adjustable.
27. Dispensing system according to any of the preceding clauses, wherein the dispensing system comprises a base structure constructed and arranged to position the dispensing system in a use position when placed on a surface.
28. Dispensing system according to any of the preceding clauses, wherein the holder transporter comprises a rotation plate and the holder transporter is configured and arranged to rotate the rotation plate around the rotation axis.
29. Dispensing system according to any of the preceding clauses, wherein the fluid holder is constructed and arranged to engage the rotation plate to be moved along with the rotation plate.
30. Dispensing system according to any of the preceding clauses, wherein the fluid holder is constructed and arranged to engage an attachment member provided on the rotation plate.
31. Dispensing system according to any of the preceding clauses, wherein the fluid holder is constructed and arranged to be attached to rotating arms constructed and arranged to rotate around the ration axis.
32. Dispensing system according to any of the preceding clauses, wherein the holder transporter comprises a track along which the fluid holders are guided.
33. Dispensing system according to any of the preceding clauses, wherein the holder transporter comprises a rail along which the fluid holders are guided.
34. Dispensing system according to any of the preceding clauses, wherein the trajectory comprises ends.
35. Dispensing system according to any of the preceding clauses, wherein the holder transporter is constructed and arranged to move the fluid holders back and forth along the trajectory.
36. Dispensing system according to any of the preceding clauses, wherein the trajectory is non-circular
37. Dispensing system according to any of the preceding clauses, wherein the trajectory is oval.
38. Dispensing system according to any of the preceding clauses, wherein the trajectory has a mountain-like form.
39. Dispensing system according to any of the preceding clauses, wherein the trajectory has a valley-like form.
40. Dispensing system according to any of the preceding clauses, wherein the holder transporter comprises a transporter driver constructed and arranged to drive the fluid holders along the trajectory.
41. Dispensing system according to any of the preceding clauses, wherein in the second orientation the orientation line is oriented under an angle of around 90° relative to said downwards vertical direction.
42. Dispensing system according to any of the preceding clauses, wherein the plane in use is positioned under an angle of around 45° with the horizontal.
43. Dispensing system according to any of the preceding clauses, wherein the controlling device is connected to the transporter driver via a communication connection.
44. Dispensing system according to any of the preceding clauses, wherein the controlling device is connected to the holder transporter via a communication connection.
45. Dispensing system according to any of the preceding clauses, wherein the controlling device is connected to the transporter driver via a communication connection.
46. Dispensing system according to any of the preceding clauses, wherein the controlling device is connected to the dispensing device via a communication connection.
47. Dispensing system according to any of the preceding clauses, wherein the controlling device is connected to a user interface via a communication connection.
48. Dispensing system according to any of the preceding clauses, wherein holder transporter is constructed and arranged to move the fluid holders along the trajectory during time periods wherein no colorant fluid is dispensed.
49. Dispensing system according to any of the preceding clauses, wherein the fluid holder comprises a holder driver to drive the colorant fluid out of the fluid holder.
50. Dispensing system according to any of the preceding clauses, wherein the holder driver is only connected to the fluid holder.
51. Dispensing system according to any of the preceding clauses, wherein the fluid holder comprises at least one movable pressure member and the holder driver is constructed and arranged to drive at least one movable pressure member for applying a pressure to the colorant fluid.

52. Dispensing system according to any of the preceding clauses, wherein the holder driver is constructed and arranged to apply a substantially constant pressure to the colorant fluid.

53. Dispensing system according to any of the preceding clauses, wherein the holder driver is constructed and arranged to continuously drive the at least one pressure member.

54. Dispensing system according to any of the preceding clauses, wherein the holder driver comprises a spring.

55. Dispensing system according to any of the preceding clauses, wherein the fluid holder comprises a fluid space for receiving the colorant fluid and the at least one pressure member is constructed and arranged to move such that the volume of the fluid space is reduced.

56. Dispensing system according to any of the preceding clauses, wherein the fluid holder is constructed and arranged to hold a flexible fluid package containing colorant fluid and to apply a pressure to the fluid package to drive the colorant fluid out of the fluid package.

57. Dispensing system according to any of the preceding clauses, wherein the fluid space is constructed and arranged to receive the fluid package.

58. Dispensing system according to any of the preceding clauses, wherein the fluid holder comprises two pressure members between which in use the fluid package is held and at least one of the pressure members is moveable relative to the other pressure member.

59. Dispensing system according to any of the preceding clauses, wherein the holder driver is constructed and arranged to drive the pressure members towards each other.

60. Dispensing system according to any of the preceding clauses, wherein the pressure members are pivotable relative to each other.

61. Dispensing system according to any of the preceding clauses, wherein the fluid holder comprises an attachment unit constructed and arranged to in use attach the fluid package to the fluid holder.

62. Dispensing system according to any of the preceding clauses, wherein the weight measuring device is constructed and arranged to support in the vertical direction the fluid holder from which colorant fluid is dispensed.

63. Dispensing system according to any of the preceding clauses, wherein the weight measuring device is constructed and arranged to in use provide substantially the only support in the vertical direction of the fluid holder from which colorant fluid is dispensed.

64. Dispensing system according to any of the preceding clauses, wherein the dispensing system is constructed and arranged to, apart from the force applied by the weight measuring device, in the vertical direction only apply a constant force to the fluid holder from which colorant fluid is dispensed.

65. Dispensing system according to any of the preceding clauses, wherein in use said constant vertical force compensates part of the weight of the fluid holder holding the colorant fluid.

66. Dispensing system according to any of the preceding clauses, wherein the dispensing device is constructed and arranged to apply the constant vertical force on the fluid holder.

67. Dispensing system according to any of the preceding clauses, wherein the fluid holder comprises at least one support member and the weight measuring device is configured and arranged to support the fluid holder via the at least one support member.

68. Dispensing system according to any of the preceding clauses, wherein the dispensing device is constructed and arranged to apply a force on the holder valve in a horizontal direction.

69. Dispensing system according to any of the preceding clauses, wherein the dispensing device comprises a movable valve actuator constructed and arranged to apply the horizontal force on the holder valve.

70. Dispensing system according to any of the preceding clauses, wherein the fluid holder comprises a fixating member constructed and arranged to withstand the horizontal force applied by the dispensing device on the holder valve.

71. Dispensing system according to any of the preceding clauses, wherein the dispensing system comprises a dispensing support constructed and arranged to in a horizontal direction remain in a stationary position and the fixating member of the fluid holder from which the colorant fluid is dispensed is placed in contact with the dispensing support.

72. Dispensing system according to any of the preceding clauses, wherein the holder valve is constructed and arranged to be in the closed position when not activated and in the open position when activated by the dispensing device.

73. Dispensing system according to any of the preceding clauses, wherein the dispensing device is constructed and arranged to active the holder valve.

74. Dispensing system according to any of the preceding clauses, wherein the weight measuring device comprises a communication connection with the controlling device.

75. Dispensing system according to any of the preceding clauses, wherein the controlling device comprises a calculator constructed and arranged to calculate weight changes of the fluid holder during the dispensing of the colorant fluid from said fluid holder.

76. Dispensing system according to any of the preceding clauses, wherein the controlling device is constructed and arranged to control the dispensing device on basis of data provided by the weight measuring device.

77. Dispensing system according to any of the preceding clauses, wherein the holder transporter is constructed and arranged to removably hold the fluid holders.

78. Dispensing system according to any of the preceding clauses, wherein the dispensing system comprises a transfer device constructed and arranged to transfer the fluid holders from the holder transporter into a dispensing position and back to the holder transporter.

79. Dispensing system according to any of the preceding clauses, wherein the holder transporter is constructed and arranged to position the fluid holders in a transfer position allowing the fluid holders to be transferred from the holder transporter.

80. Dispensing system according to any of the preceding clauses, wherein the transfer device is constructed and arranged to transfer the fluid holders located in the transfer position into the dispensing position and back into the transfer position.

81. Dispensing system according to any of the preceding clauses, wherein the weight measuring device is constructed and arranged to measure the weight changes of the fluid holder positioned in the dispensing position.

82. Dispensing system according to any of the preceding clauses, wherein the fluid holder is constructed and arranged to be attached to the holder transporter.

83. Dispensing system according to any of the preceding clauses, wherein the at least one pressure member is constructed and arranged to engage the holder transporter.

84. Dispensing system according to any of the preceding clauses, wherein the at least one pressure member is constructed and arranged to attach the fluid holder to the holder transporter.
85. Dispensing system according to any of the preceding clauses, wherein the fluid holder is constructed and arranged to free the fluid package from pressure when the fluid holder is attached to the holder transporter.
86. Dispensing system according to any of the preceding clauses, wherein the holder outlet of the fluid holder positioned in the dispensing position defines the system outlet of the dispensing system.
87. Use of a colorant fluid dispensing system according to any of the preceding clauses.
88. Method of dispensing a colorant fluid from a dispensing system according to any of the clauses 1, 2, 5-86, wherein the method comprises changing of an orientation of the fluid holders to achieve a mixing effect in the colorant fluids held by the fluid holders.
89. Method according to clause 88, wherein the method comprises activating the holder transporter when the fluid holders have not been moved along the trajectory for a predetermined time period.
90. Method of dispensing a colorant fluid from a dispensing system according to any of the clauses 3, 4, 5-86, wherein the method comprises measuring weight changes of the fluid holder during the dispensing of the colorant fluid from said fluid holder.

It will be apparent to those skilled in the art that various modifications can be made to the colorant fluid dispensing system disclosed without departing from the scope and spirit thereof.

What is claimed is:

1. Colorant fluid dispensing system for dispensing multiple colorant fluids, wherein said dispensing system comprises:
   fluid holders for holding respective colorant fluids,
   a dispensing device for dispensing the colorant fluids held by the fluid holders out of a system outlet, wherein
   the dispensing system comprises a weight measuring device constructed and arranged to measure weight changes of a given fluid holder during the dispensing of colorant fluid from said given fluid holder, and
   the given fluid holder is constructed and arranged to drive the colorant fluid from said given fluid holder,
   wherein the dispensing system comprises a holder transporter for transporting the fluid holders along a trajectory.
2. The dispensing system according to claim 1, wherein the weight measuring device is constructed and arranged to support the given fluid holder in the vertical direction.
3. The dispensing system according to claim 1, wherein the dispensing system is constructed and arranged to, apart from force applied by the weight measuring device, in the vertical direction only apply a constant force to the given fluid holder.
4. The dispensing system according to claim 3, wherein in use said constant force compensates around 50% of the weight of the given fluid holder.
5. The dispensing system according to claim 2, wherein the dispensing system comprises a transfer device constructed and arranged to transfer the fluid holders from the holder transporter into a dispensing position and back to the holder transporter.
6. The dispensing system according to claim 5, wherein the given fluid holder located in the dispensing position is uncoupled from the holder transporter.
7. The dispensing system according to claim 1, wherein the holder transporter is constructed and arranged to position the fluid holders in a transfer position allowing the fluid holders to be transferred from the holder transporter.
8. The dispensing system according to claim 5, wherein the weight measuring device is constructed and arranged to measure the weight changes of the given fluid holder positioned in the dispensing position.
9. The dispensing system according to claim 1, wherein the fluid holders each comprise a holder driver to drive colorant fluid from the fluid holders.
10. The dispensing system according to claim 9, wherein the given holder driver is only connected to the fluid holder.
11. The dispensing system according to claim 9, wherein the given fluid holder comprises at least one movable pressure member and the holder driver is constructed and arranged to drive at least one pressure member for applying a pressure to the colorant fluid.
12. The dispensing system according to claim 9, wherein the holder driver is constructed and arranged to apply a substantially constant pressure to the colorant fluid.
13. The dispensing system according to claim 11, wherein the holder driver is constructed and arranged to continuously drive at least one pressure member.
14. The dispensing system according to claim 1, wherein the given fluid holder is constructed and arranged to hold a flexible fluid package containing colorant fluid and to apply a pressure to the fluid package to drive the colorant fluid out of the fluid package.
15. The dispensing system according to claim 14, wherein the given fluid holder comprises two pressure members between which in use the fluid package is held and at least one of the pressure members is moveable relative to the other pressure member.
16. The dispensing system according to claim 1, wherein the weight measuring device is constructed and arranged to in use provide substantially the only support in the vertical direction of the given fluid holder.
17. The dispensing system according to claim 1, wherein the given fluid holder comprises a holder outlet which in use comprises a fluid connection with the colorant fluid, the holder outlet comprises a holder valve which is connected to the fluid connection and placeable in a closed position in which the fluid connection is closed and an open position in which the fluid connection is open, and the dispensing device is constructed and arranged to apply a force on the holder valve in a horizontal direction.
18. The dispensing system according to claim 17, wherein the dispensing device comprises a movable valve actuator constructed and arranged to apply the horizontal force on the holder valve.
19. A method of dispensing the colorant fluid from a dispensing system according to claim 1, comprising:
   dispensing the colorant fluid held by the given fluid holder out of a system outlet; and
   measuring weight changes of said given fluid holder during the dispensing of the colorant fluid from said given fluid holder.

* * * * *